(12) United States Patent
Mittal

(10) Patent No.: US 10,372,739 B2
(45) Date of Patent: *Aug. 6, 2019

(54) CORPUS SEARCH SYSTEMS AND METHODS

(71) Applicant: NLPCORE LLC, Seattle, WA (US)

(72) Inventor: Varun Mittal, Seattle, WA (US)

(73) Assignee: NLPCORE LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/125,613

(22) Filed: Sep. 7, 2018

(65) Prior Publication Data

US 2019/0005049 A1 Jan. 3, 2019

Related U.S. Application Data

(63) Continuation-in-part of application No. 14/216,059, filed on Mar. 17, 2014, now Pat. No. 10,102,274.

(51) Int. Cl.
| | |
|---|---|
| *G06F 17/30* | (2006.01) |
| *G06F 16/33* | (2019.01) |
| *G06F 17/27* | (2006.01) |
| *G06F 16/31* | (2019.01) |
| *G06F 16/338* | (2019.01) |

(52) U.S. Cl.
CPC ........ *G06F 16/3344* (2019.01); *G06F 16/316* (2019.01); *G06F 16/334* (2019.01); *G06F 16/338* (2019.01); *G06F 16/3347* (2019.01); *G06F 17/2705* (2013.01); *G06F 16/313* (2019.01)

(58) Field of Classification Search
CPC ............. G06F 17/3069; G06F 17/2705; G06F 16/3344; G06F 16/3347

USPC ........................................................ 707/724
See application file for complete search history.

(56) References Cited

U.S. PATENT DOCUMENTS

| | | | | |
|---|---|---|---|---|
| 5,265,065 A * | 11/1993 | Turtle | ................ | G06F 16/3346 |
| 5,418,717 A * | 5/1995 | Su | .......................... | G06F 17/271 704/9 |
| 7,152,031 B1 * | 12/2006 | Jensen | ................ | G06F 17/2785 704/10 |
| 7,197,451 B1 * | 3/2007 | Carter | ................ | G06F 16/3344 704/10 |
| 7,890,521 B1 * | 2/2011 | Grushetskyy | ....... | G06F 16/9535 707/755 |

(Continued)

*Primary Examiner* — Pierre M Vital
*Assistant Examiner* — Nargis Sultana
(74) *Attorney, Agent, or Firm* — AEON Law, PLLC; Adam L.K. Philipp; David V.H. Cohen

(57) ABSTRACT

A corpus of texts relating to a domain of knowledge may be searched by determining word-pair proximity scores measuring associations between pairs of words that appear in the corpus and that are semantically related to the domain of knowledge. When a search term is received, the word-pair proximity scores may be used (at least in part) with dictionary overlays, user feedback, and other feature vectors as weighting mechanisms to identify one or more related words that are strongly associated with the search term within the corpus. One or more texts may be selected from the corpus, texts in which the search term and the related words appear near each other in one or more places. The selected texts may be categorized and/or clustered based on the related words before being returned for presentation as Search Results.

28 Claims, 22 Drawing Sheets

(56) References Cited

U.S. PATENT DOCUMENTS

| | | | | |
|---|---|---|---|---|
| 2003/0194689 A1* | 10/2003 | Kamasaka | ............ | G06F 17/272 |
| | | | | 434/350 |
| 2004/0059565 A1* | 3/2004 | Dehlinger | ........... | G06F 17/2715 |
| | | | | 704/5 |
| 2005/0120011 A1* | 6/2005 | Dehlinger | ........... | G06F 17/2705 |
| 2005/0198026 A1* | 9/2005 | Dehlinger | ............. | G06F 17/277 |
| 2006/0277165 A1* | 12/2006 | Yoshimura | .......... | G06F 16/3329 |
| 2007/0106491 A1* | 5/2007 | Carter | ................... | G06F 17/277 |
| | | | | 704/4 |
| 2008/0189269 A1* | 8/2008 | Olsen | .................... | G06F 16/951 |
| 2008/0215543 A1* | 9/2008 | Huang | ................ | G06F 16/9535 |
| 2008/0313202 A1* | 12/2008 | Kamen | ................ | G06F 16/951 |
| 2009/0228777 A1* | 9/2009 | Henry | .................... | G06F 16/40 |
| | | | | 715/230 |
| 2010/0257159 A1* | 10/2010 | Uematsu | ............... | G06F 16/334 |
| | | | | 707/723 |
| 2014/0229159 A1* | 8/2014 | Branton | ................ | G06F 16/345 |
| | | | | 704/9 |
| 2015/0135053 A1* | 5/2015 | Doornenbal | ........... | G06F 16/93 |
| | | | | 715/230 |
| 2015/0161109 A1* | 6/2015 | Talbot | ................... | G06F 17/271 |
| | | | | 704/2 |

\* cited by examiner

Results

- Relating word:drug
- Score:294
  - Entity:Malaria Drug Resistance MDR
    - Specifically, the phenomena of CQ and S/P resistant P. falciparum are well described in Africa and been demonstrated to have spread from Southeast Asia to Africa in so-called "selective sweeps", suggesting that history may repeat itself with the newly discovered artemisinin resistance phenomenon in Southeast Asia.*The Malaria Drug Resistance (MDR) laboratory of the U.S. Army Medical Research Unit – Kenya (USAMRU-K), based in Kisumu, in collaboration with the Kenya Medical Research Institute and Kenya Ministry of Health, has monitored in vitro malaria drug sensitivity and molecular marker profiles across Kenya since 1995.*In 2009, P. falciparum drug resistance surveillance efforts focused in western Kenya at three district hospitals in Kisumu, Kericho, and Kisii.
  - Paper
  - Entity:common malaria drug
    - This underscores the threat posed by emerging drug resistance and the importance of effective surveillance systems to detect the onset of resistance and assure optimal treatments.*In 2009, the AFHSC-GEIS laboratory network analyzed 19,730 specimens from 25 sites spanning malaria-endemic regions using techniques, such as molecular characterization of resistance genes and in vitro drug sensitivity assays to determine inhibitory concentrations against a battery of common malaria drugs.*Some sites are also capable of conducting therapeutic efficacy and complex pharmacokinetic in vivo studies to better understand drug-parasite interactions.
  - Paper
  - Entity:antimalarial drug policy
    - The dissatisfaction of the community about the efficacy of SP is inline with the nationwide failure of SP for the treatment of falciparum malaria in Ethiopia in 2003.*In 2004, Ethiopia adopted a new antimalarial drug policy and abandoned SP as the first-line treatment for confirmed uncomplicated falciparum malaria in favour of ACT (artemether-lumefantrine).*The decision created the need to find ways of availing and effectively administering the new drug.
  - Paper

*Fig. 8*

- Relating word:reagent
- Score:257
  - Entity:Reference Reagent Resource Center MR4
    - Sequencing of the Plasmodium vivax Salvador I strain from TIGR was accomplished with support from the National Institute of Allergy and Infectious Diseases/Department of Defense (NIAID/DoD).*This work was supported by "Fundação de Amparo à Pesquisa do Estado de São Paulo (FAPESP, ID 01/09401-0), Malaria Research and Reference Reagent Resource Center (MR4), and "Conselho Nacional de Desenvolvimento Científico e Tecnológico" (CNPq, ID 304651/90-7).*
    - Paper
  - Entity:Reference Reagent Resource Center MR4
    - Samples were resolved and analyzed in an ABI3700 96-capillary DNA sequencer (Applied Biosystems).*Bacterial clones from all the ESTs are available on request via the Malaria Research and Reference Reagent Resource Center (MR4) at http://www.malaria.mr4.org*.An automated analysis pipeline was constructed to process the reads (E-Gene – a pipeline generation system, A. Gruber & A.M. Durham, manuscript in preparation).
    - Paper
  - Entity:Reference Reagent Resource Center MR4
    - Samples were resolved and analyzed in an ABI3700 96-capillary DNA sequencer (Applied Biosystems).*Bacterial clones from all the ESTs are available on request via the Malaria Research and Reference Reagent Resource Center (MR4) at http://www.malaria.mr4.org*.An automated analysis pipeline was constructed to process the reads (E-Gene – a pipeline generation system, A. Gruber & A.M. Durham, manuscript in preparation).
    - Paper
  - Entity:Malaria Research Reference Reagent Resource Center MR4
    - Remedial courses were conducted with funds from US Department of Defense Global Emerging Infections Surveillance System (GEIS), US President's Malaria Initiative (PMI) and Malaria Clinical Trials Alliance (MCTA).*Plasmodium vivax blood films were obtained from Armed Forces Research Institute of Medical Sciences (AFRIMS) and Malaria Research Reference Reagent Resource Center (MR4).*We thank Kingsley Kayan, Dominic Dery of KHRC and Cornel Arima,

Fig. 9

|  | Carolina | Panthers | football | team | professional |
|---|---|---|---|---|---|
| a | ⋮ | ⋮ | ⋮ | ⋮ | ⋮ |
| city | ⋮ | ⋮ | ⋮ | ⋮ | ⋮ |
| American | ⋮ | ⋮ | [1, 1, 1, 1, 2, 4, 3, 5] (quality) | ⋮ | ⋮ |
| port | ⋮ | ⋮ | ⋮ | ⋮ | ⋮ |
| Seattle | ⋮ | ⋮ | ⋮ | ⋮ | ⋮ |

Fig. 17

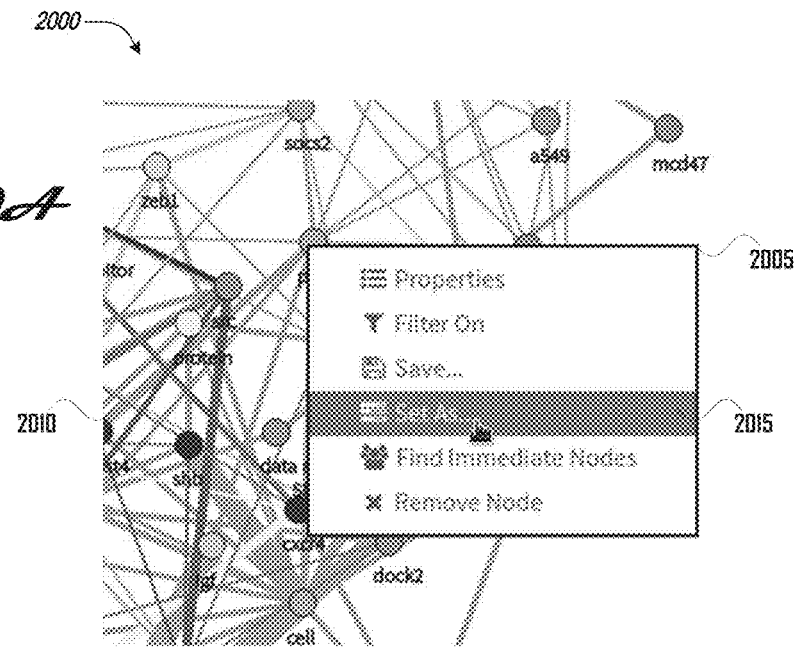

CORPUS SEARCH SYSTEMS AND METHODS

This application is a continuation-in-part of non-provisional U.S. patent application Ser. No. 14/216,059, filed Mar. 17, 2014, titled CORPUS SEARCH SYSTEMS AND METHODS, and naming inventor Varun Mittal. The above cited application is hereby incorporated by reference, in its entirety, for all purposes. The Application Data Sheet filed herewith forms a part of the present application, and all priority documents to which it refers are incorporated by reference herein in their entirety.

FIELD

This disclosure is directed to improved computing systems and methods for searching a corpus of texts relating to a domain of knowledge.

BACKGROUND

General-purpose search engines have become reasonably good at providing meaningful search results, particularly in domains of knowledge that are not highly technical and/or specialized. Some general-purpose search engines employ "semantic" search techniques in an attempt to improve search accuracy by understanding searcher intent and the contextual meaning of terms as they appear in the searchable dataspace. Generally, semantic search systems may consider various signals including context of search, location, intent, variation of words, synonyms, concept matching and natural language queries to provide relevant search results.

Many search engines, semantic or otherwise, use various Natural Language Processing ("NLP") techniques to perform operation such as tokenization, parsing, part-of-speech tagging, named entity recognition, and the like. While many existing NLP parsers do a reasonably good job at parsing "ordinary" texts in a given language, highly specialized and/or technical language is frequently misinterpreted by general-purpose parsers.

Because documents pertaining to many domains of knowledge frequently use specialized and/or technical language, existing NLP techniques (as well as the search engines that rely on them) often provide inaccurate and/or suboptimal results when searching across a specialized domain of knowledge.

BRIEF DESCRIPTION OF THE DRAWINGS

FIG. 8 illustrates an example search-results user-interface showing three search-results for the search term 'malaria' and the related-noun 'drug', in accordance with one embodiment.

FIG. 9 illustrates an example search-results user-interface showing four search-results for the search term 'malaria' and the related-noun 'reagent', in accordance with one embodiment.

FIG. 17 illustrates a word-pair feature data structure comprising a matrix or table of word-pair entries, containing skip-gram co-occurrence distances for a pair of words.

FIGS. 20A-B illustrate screenshots of an example user interface to rate or classify a search result.

DESCRIPTION

Figure 1:
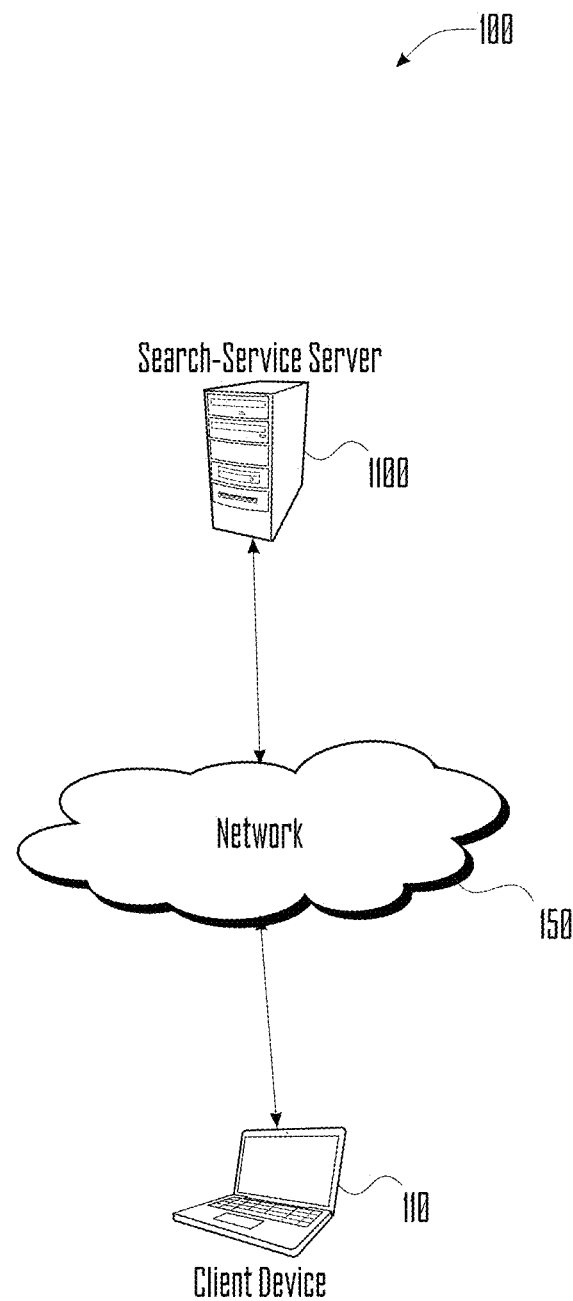
FIG. 1 illustrates a simplified search system in which search-service server and client device are connected to network.

In various embodiments, as described further herein, one or more domain-of-knowledge-specific heuristics may be used to improve the output of a general-purpose NLP parser when processing texts related to a particular domain of knowledge. Once key terms or entities in a text have been properly identified, each entity in a text may be placed in a statistical model variably linking it to other entities in the text based upon a measure of intra-clause proximity. In some embodiments, a user may validate the parsed data.

Such a statistical model measuring intra-clause proximity may subsequently be used to identify texts that are related to a search term and/or to cluster and/or categorize texts within a corpus. Relatedly, a statistical entities model may also be used to identify subjects and/or key concepts that are discussed in a text.

Additional input for concept matching can be applied in the form of dictionary definitions, taxonomy classifications, word embeddings, skip-gram frequencies, document metadata, and other attributes related to entities in the text (e.g., word pairs). Attributes such as these and explicit and implicit user feedback can be further combined with natural language processing and semantic information to increase the accuracy of the results.

Recording user interaction patterns as feedback on search results allows these search systems to improve future search results. Matched term types are used as implicit feedback and also used to correct neighboring references; thereafter, each entity in a text may be placed in a statistical model variably linking it to other entities in the text based upon a measure of intra-clause proximity, among other attributes. User actions can be processed as positive feedback implicitly endorsing some results for a search (e.g., where a user selects a word, category, or set of results to narrow a search query to look at specific results) or as negative feedback (e.g., where the user does not select a result for further investigation). A search system can also obtain explicit user feedback (e.g., a relevance rating for a search result).

The computing systems and methods described in this disclosure improve and extend search systems and methods including part of speech tags and statistical attributes (such as terms frequency or proximity scores) to provide contextually relevant results from searching a corpus of texts relating to a domain of knowledge. The described systems and methods can determine, store, decorate, and retrieve a word pair (whether adjacent or not) along with a number of attributes beyond part of speech or statistical attributes. Such attributes can include, e.g., those from one or more dictionaries, classifiers, explicit or implicit user-feedback, surrounding text, document metadata, word embeddings, and many more that together help further refine and make results more relevant for a given search.

This disclosure uses terminology including but not limited to the following:

Word Pair—Any two words of potential interest that appear some distance apart in text (e.g., adjacent or separated by several words). For example, in the text "NGF-inducible anti-proliferative protein PC3," NGF and PC3 are a possible word pair, as are protein and PC3.

Text Vector—An ordered set of words. In various embodiments, a text vector may comprise a predetermined number of words, a phrase, an independent clause, a sentence, a paragraph, a block of text, a defined portion of text (e.g., a subsection or a chapter), a page, or an entire document. A text vector of at least two words contains word pairs and can have a set of attributes shared by all word pairs within.

Skip-gram—An extension of an n-gram sequence of n words, in which the n words need not be adjacent but can skip over intermediate words, further described below in connection with FIG. 17.

Feature Vector—A data structure associating a word pair with features or attributes of certain types (such as proximity score, dictionary, user feedback, skip-gram attribute data, document metadata, etc.), further described below in connection with FIG. 18.

Word-Pair Feature Data Structure—A data structure associating a number of word pairs (e.g., word pairs associated with a text or a corpus of texts) with their respective feature or attribute data (e.g., feature vectors).

In some embodiments, a computational engine populates a word-pair feature data structure that includes or extends word-pair-score data structures and can also include one or more attribute data records. For example, the word-pair feature data structure can comprise a matrix or table of word-pair entries. One axis or dimension of the matrix may be words from a text (or, e.g., a portion of text or a corpus of texts), and another axis or dimension of the matrix may be context words, such as words related to the words in the first axis or dimension. Such a matrix can be implemented as a hash table, a multidimensional array, a multidimensional list, or a key-value map data structure indexed by at least one word of each word pair.

Each entry in such a data structure can comprise a container for or reference to a word-pair-score data structure and one or more attribute data records. Associating an entry (e.g., a set of attribute data) with a word pair can be described as decorating the word pair with the entry data. For example, a word-pair feature data structure entry can comprise a record in the word-pair feature data structure itself and/or one or more pointers to other data or data structures. In some embodiments, an entry in a word-pair feature data structure can be a vector of attribute data (a "feature vector"). For example, such vectors can be stored as a third dimension for a given word-pair per document.

Attribute data populating an entry in a word-pair feature data structure (e.g., a vector) can be, for example, generated using statistical features (e.g., individual/joint frequencies, distances, part of speech tags, etc.), dictionary-aggregated data, feedback from a particular user, feedback from multiple users, special-purpose text pattern recognizers or classifiers (configured to identify, e.g., names of people, places, and/or products; or units, dates, and/or times), and so on. Examples of such attribute data populating an entry in a word-pair feature data structure are described in further detail below in connection with FIG. 18.

In some embodiments, the computational engine uses skip-grams, text-to-vector algorithms, and/or other algorithms to add feature data to a word-pair feature data structure entry. In various embodiments, the computational engine uses neural networks and/or other machine learning approaches to find more optimal word pairs using feature vector data in a word-pair feature data structure entry.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein. For example, the embodiments set forth below are primarily described in the context of a web browser-based search interface for user searches regarding biomedical and life sciences literature, specifically having to do with malaria. However, these embodiments are illustrative examples and in no way limit the disclosed technology to any particular form of search tool, body of knowledge, or type of inquiry.

FIG. 1 illustrates a simplified search system in which search-service server 1100 and client device 110 are connected to network 150.

Search-service server 1100 (see FIG. 11, discussed below) represents a provider of corpus-search services, such as described more fully below.

In various embodiments, network 150 may include the Internet, a local area network ("LAN"), a wide area network ("WAN"), and/or other data network.

In various embodiments, client device 110 may include desktop PCs, mobile phones, laptops, tablets, wearable computers, or other computing devices that are capable of connecting to network 150, sending search terms to search-service server 1100, and presenting search results, such as described herein.

In various embodiments, additional infrastructure (e.g., cell sites, routers, gateways, firewalls, and the like), as well as additional devices may be present. Further, in some embodiments, the functions described as being provided by some or all of search-service server 1100 may be implemented via various combinations of physical and/or logical devices.

For example, in one embodiment, search-service server 1100 may include and/or make use of a platform-as-a-service such as the Google App Engine, provided by Google Inc. of Menlo Park, Calif. In such an embodiment, the platform-as-a-service may provide a set of processing nodes that are scaled up/down based upon the number of texts in a queue. Once texts are processed (as described further below), the resulting search index may be stored in corpus-data database 1140, which may utilize the App Engine's BigTable. A front-end search interface may be built using a programming language supported by the platform-as-a-service (e.g., Python, Java, Go, or the like) to accesses results from the data store and display them to the user in tabular and/or graphical visualizations such as those shown in search-results user-interface 900 (see FIG. 9, discussed below), and/or search-results user-interface 1000 (see FIG. 10, discussed below).

However, it is not necessary to show such infrastructure and implementation details in FIG. 1 in order to describe an illustrative embodiment.

Figure 2:
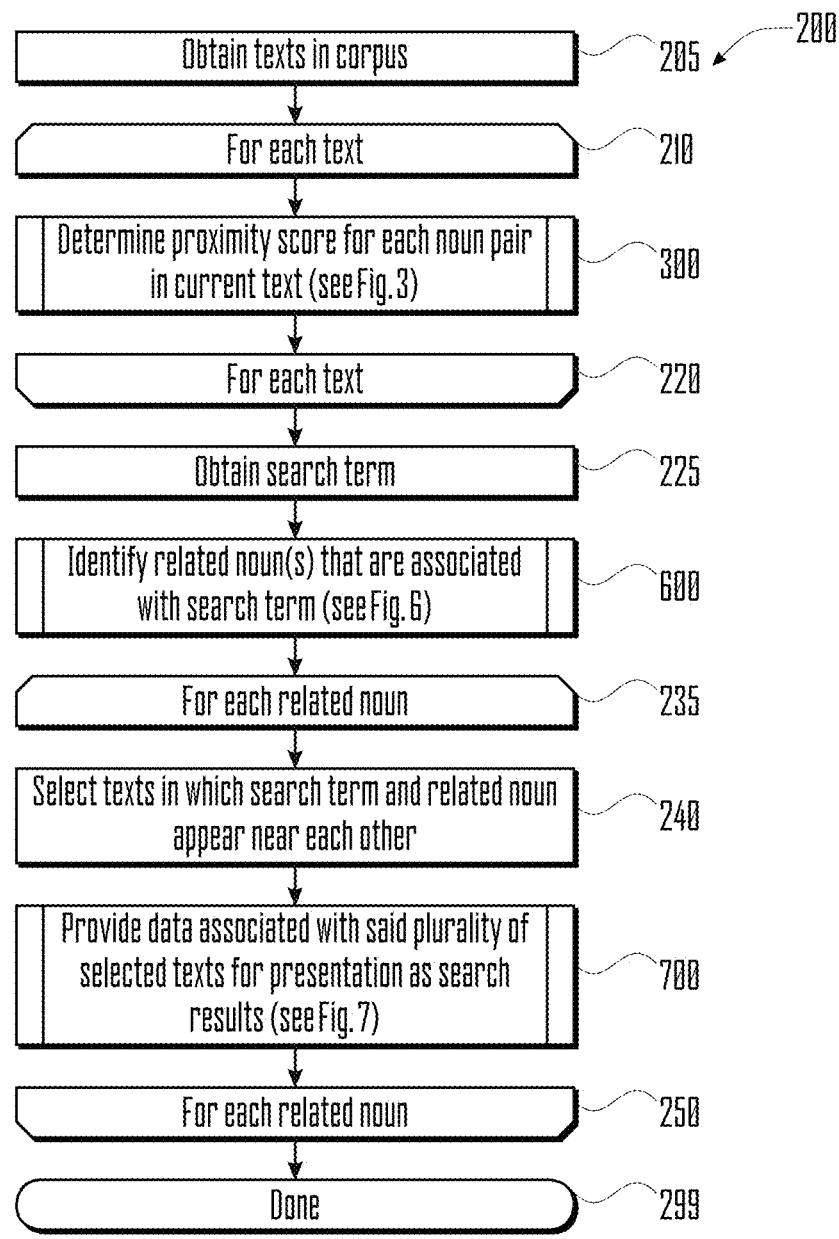
FIG. 2 illustrates a search routine for searching a corpus of texts relating to a domain of knowledge, such as may be performed by a search-service server in accordance with one embodiment.

FIG. 2 illustrates a search routine 200 for searching a corpus of texts relating to a domain of knowledge, such as may be performed by a search-service server 1100 in accordance with one embodiment.

In block 205, search routine 200 obtains the contents of a set of texts that make up a corpus directed to some domain of knowledge. For example, in one embodiment, which will be used as an example to illustrate various operations described below, search routine 200 may obtain the contents of a set of technical articles such as those included in the PubMed Central® ("PMC") archive of biomedical and life sciences journal literature at the U.S. National Institutes of Health's National Library of Medicine.

Beginning in opening loop block 210, search routine 200 processes each text in turn.

In subroutine block 300, search routine 200 calls subroutine 300 (see FIG. 3, discussed below) to determine a proximity score for word pairs in the current text of the corpus. Generally, a proximity score measures associations between a pair of words that appear in the current text and that are semantically related to the domain of knowledge. Proximity scores, their significance, and their uses, are described in further detail below.

In various examples provided herein, each of the words in a word pair is a noun. The systems and methods described herein are applicable to various part-of-speech words and are not limited to noun pairs. In some embodiments, word pairs can include non-noun words. For example, word pairs can include adjective-noun pairs, noun-verb pairs, adverb-verb pairs, adjective-adjective pairs, and so on. In some embodiments, the system or method can include or exclude pairs or matches based on parts of speech to limit or improve results. For example, linking words such as articles, conjunctions, or prepositions (e.g., "a", "and", or "of") may be excluded from word pairs, though the system and method may use such linking words in determining word pair relationships as described in further detail below.

In ending loop block 220, search routine 200 iterates back to opening loop block 210 to process the next text, if any.

After each text of the corpus has been processed, in block 225, search routine 200 obtains a search term, e.g., from client device 110, related to a domain of knowledge. For example, in an example embodiment based on a corpus of texts from the PMC archive, search routine 200 may obtain a search term such as "malaria" (a type of disease), "culex" (a genus of mosquito), or the like.

In subroutine block 600, search routine 200 calls subroutine 600 (see FIG. 6, discussed below) to identify, based at least in part on a multiplicity of word-pair proximity scores, one or more related words that are strongly associated with the search term within a corpus. In some embodiments, the word pairs may be noun pairs. For example, in an example embodiment based on a corpus of texts from the PMC archive, if in block 225, search routine 200 obtained the search term "malaria", then in subroutine block 600, search routine 200 may identify a set of related nouns such as 'drug', 'antigen', 'reagent', 'virus', 'gene', 'protein', 'cell', 'disease', and 'bacteria', each of which are strongly associated with the term "malaria" within the corpus.

In various embodiments, such related nouns may be used to categorize and/or filter search results. In some embodiments, such related nouns may be presented to the searching user (e.g., using a tag-cloud interface) such that the user may indicate and/or promote particular related nouns that he or she believes are most relevant. In some embodiments, such user feedback may be incorporated into subsequent searches for similar terms.

Beginning in opening loop block 235, search routine 200 processes each related noun in turn.

In block 240, search routine 200 selects from the corpus texts in which the search term and the related noun appear near each other in at least one place. For example, in the example embodiment based on a corpus of texts from the PMC archive, when processing the search term 'malaria' and the related noun 'drug', search routine 200 may select texts having identifiers (e.g., a reference to the name of a journal and/or an article within) such as the following:

BMC_Public_Health_2011_Mar_4_11(Suppl_2)_S9;
BMC_Public_Health_2009_Jul_23_9_259;
BMC_Infect_Dis_2001_Aug_14_1_10;
BMC_Public_Health_2009_Mar_23_9_85;
Malar_J_2008_Feb_26_7_35; and
Malar_J_2013_May_24_12_168.

Using the text from 'BMC_Public_Health_2011_Mar_4_11(Suppl_2)_S9' as an example, the search term ("malaria") and the related noun ("drug") may appear near each other in two places.

More specifically, the search term and the related noun (part of the noun phrase 'Malaria Drug Resistance MDR') may appear near each other in one place as illustrated in the following contextual snippet:

Specifically, the phenomena of CQ and S/P resistant *P. falciparum* are well described in Africa and been demonstrated to have spread from Southeast Asia to Africa in so-called "selective sweeps", suggesting that history may repeat itself with the newly discovered artemisinin resistance phenomenon in Southeast Asia. The Malaria Drug Resistance (MDR) laboratory of the U. S. Army Medical Research Unit—Kenya (USAMRU-K), based in Kisumu, in collaboration with the Kenya Medical Research Institute and Kenya Ministry of Health, has monitored in vitro malaria drug sensitivity and molecular marker profiles across Kenya since 1995. In 2009, *P. falciparum* drug resistance surveillance efforts focused in western Kenya at three district hospitals in Kisumu, Kericho, and Kisii.

Similarly, the search term and the related noun (part of the noun phrase 'common malaria drug') may appear near each other in one place as illustrated in the following contextual snippet:

This underscores the threat posed by emerging drug resistance and the importance of effective surveillance systems to detect the onset of resistance and assure optimal treatments. In 2009, the AFHSC-GEIS laboratory network analyzed 19,730 specimens from 25 sites spanning malaria-endemic regions using techniques, such as molecular characterization of resistance genes and in vitro drug sensitivity assays to determine inhibitory concentrations against a battery of common malaria drugs. Some sites are also capable of conducting therapeutic efficacy and complex pharmacokinetic in vivo studies to better understand drug-parasite interactions.

In subroutine block 700, search routine 200 provides data associated with the plurality of selected texts for presentation as search results. For example, in one embodiment, search routine 200 may provide data from which a portion of an interface such as search-results user-interface 900 (see FIG. 9, discussed below), and/or search-results user-interface 1000 (see FIG. 10, discussed below) may be presented to the user.

In ending loop block 250, search routine 200 iterates back to opening loop block 235 to process the next related noun, if any.

Search routine 200 ends in ending block 299.

Figure 3:
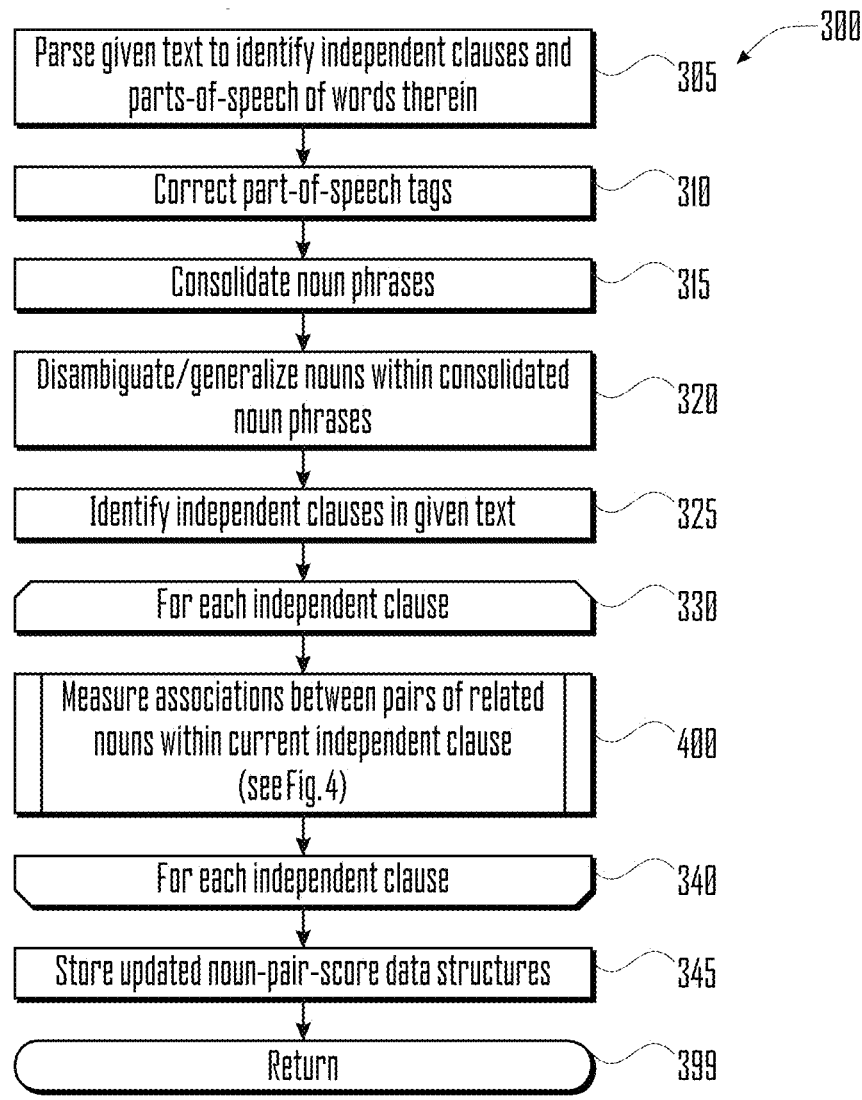
FIG. 3 illustrates a proximity-score subroutine for measuring associations between nouns that appear in a given text, such as may be performed by a search-service server in accordance with one embodiment.

FIG. 3 illustrates a proximity-score subroutine 300 for measuring associations between nouns that appear in a given text, such as may be performed by a search-service server 1100 in accordance with one embodiment.

In block 305, proximity-score subroutine 300 parses the given text to identify the independent clauses making up the text, and to tag individual words according to their possible parts of speech. In some embodiments, proximity-score subroutine 300 may employ a general-purpose NLP package for such purposes. In one embodiment, proximity-score subroutine 300 may employ a NLP package such as the Stanford CoreNLP package, provided by The Stanford Natural Language Processing Group at Stanford University or Stanford, Calif., or components thereof. In other embodiments, other NLP packages and/or components may be employed to perform tasks such as tokenization and sentence splitting, part-of-speech tagging, statistical parsing, and the like.

For example, in one embodiment proximity-score subroutine 300 may employ suitable NLP software to process a portion of a text, such as the following example sentence.

This is the case for *Anopheles atroparvus*, the primary vector of human malaria in Spain in the past, which has recently been incriminated in a case of autochthonous malaria transmission, and different Culex species involved in the transmission of avian malaria and West Nile and Usutu virus.

In one embodiment, a NLP parsing component may in block 305 produce tagged output similar to the following, which annotates each word or token with a part-of-speech tag such as "NN", which indicates that the annotated word is a "Noun, singular or mass"; "VBP", which indicates that the annotated word is a "Verb, non-$3^{rd}$ person singular present"; and the like.

This/DT is/VBZ the/DT case/NN for/IN *Anopheles*/NNP *atroparvus*/NN,/, the/DT primary/JJ vector/NN of/IN human/JJ malaria/NN in/IN Spain/NNP in/IN the/DT past/NN,/, which/WDT has/VBZ recently/RB been/VBN incriminated/VBN in/IN a/DT case/NN of/IN autochthonous/JJ malaria/NN transmission/NN,/, and/CC different/JJ Culex/JJ species/NNS involved/VBN in/IN the/DT transmission/NN of/IN avian/JJ malaria/NN and/CC West/NNP Nile/NNP and/CC Usutu/NNP virus/NN.

The same tagged sentence may be equivalently represented as a data structure such as the following.

{word: This, tag: Determiner}
{word: is, tag: "Verb, 3rd person singular present"}
{word: the, tag: Determiner}
{word: case, tag: "Noun, singular or mass"}
{word: for, tag: Preposition or subordinating conjunction}
{word: *Anopheles*, tag: "Proper noun, singular"}
{word: *atroparvus*, tag: "Noun, singular or mass"}
{word: ",", tag: ","}
{word: the, tag: Determiner}
{word: primary, tag: Adjective}
{word: vector, tag: "Noun, singular or mass"}
{word: of, tag: Preposition or subordinating conjunction}
{word: human, tag: Adjective}
{word: malaria, tag: "Noun, singular or mass"}
{word: in, tag: Preposition or subordinating conjunction}
{word: Spain, tag: "Proper noun, singular"}
{word: in, tag: Preposition or subordinating conjunction}
{word: the, tag: Determiner}
{word: past, tag: "Noun, singular or mass"}
{word: ",", tag: ","}
{word: which, tag: "Wh-determiner"}
{word: has, tag: "Verb, 3rd person singular present"}
{word: recently, tag: Adverb}
{word: been, tag: "Verb, past participle"}
{word: incriminated, tag: "Verb, past participle"}
{word: in, tag: Preposition or subordinating conjunction}
{word: a, tag: Determiner}
{word: case, tag: "Noun, singular or mass"}
{word: of, tag: Preposition or subordinating conjunction}
{word: autochthonous, tag: Adjective}
{word: malaria, tag: "Noun, singular or mass"}
{word: transmission, tag: "Noun, singular or mass"}
{word: ",", tag: ","}
{word: and, tag: Coordinating conjunction}
{word: different, tag: Adjective}
{word: Culex, tag: Adjective}

{word: species, tag: "Noun, plural"}
{word: involved, tag: "Verb, past participle"}
{word: in, tag: Preposition or subordinating conjunction}
{word: the, tag: Determiner}
{word: transmission, tag: "Noun, singular or mass"}
{word: of, tag: Preposition or subordinating conjunction}
{word: avian, tag: Adjective}
{word: malaria, tag: "Noun, singular or mass"}
{word: and, tag: Coordinating conjunction}
{word: West, tag: "Proper noun, singular"}
{word: Nile, tag: "Proper noun, singular"}
{word: and, tag: Coordinating conjunction}
{word: Usutu, tag: "Proper noun, singular"}
{word: virus, tag: "Noun, singular or mass"}

To facilitate human comprehension, this and other example data objects depicted herein are presented according to version 1.2 of the YAML "human friendly data serialization standard", specified at http://www.yaml.org/spec/1.2/spec.html. In practice, data objects may be represented internally by any suitable data structure, not necessarily the exact data structure used herein for explanatory purposes. Similarly, in practice, data object may be serialized for storage, processing, and/or transmission into any suitable format (e.g., YAML, JSON, XML, BSON, Property Lists, or the like).

In block 310, proximity-score subroutine 300 uses one or more domain-of-knowledge-specific heuristics to correct the part-of-speech tags that were determined in block 305.

For example, in one embodiment, within a biomedical and/or life sciences domain of knowledge, proximity-score subroutine 300 may employ one or more heuristics to determine that the following words were incorrectly tagged in the above example.

*atroparvus:*
_original: "Noun, singular or mass"
corrected: "Proper noun, singular"
autochthonous:
_original: Adjective
corrected: "Proper noun, singular"
Culex:
_original: Adjective
corrected: "Proper noun, singular"
malaria:
_original: "Noun, singular or mass"
corrected: "Proper noun, singular"
transmission:
_original: "Noun, singular or mass"
corrected: "Proper noun, singular"
following: malaria
virus:
original: "Noun, singular or mass"
corrected: "Proper noun, singular"
following: Usutu In other words, in one embodiment, proximity-score subroutine 300 may determine, among other things, that in the example sentence, the word 'Culex' is not an 'Adjective', but should in context be tagged as a 'Proper noun, singular'.

Similarly, in one embodiment, proximity-score subroutine 300 may determine that in the example sentence, the word 'virus' is not a 'Noun, singular or mass', but should in context be tagged as a 'Proper noun, singular' when 'virus' appears in the phrase 'Usutu virus'.

Once such corrections are made, the corrected tagged sentence may resemble a data structure similar to the following.

{word: This, tag: Determiner}
{word: is, tag: "Verb, 3rd person singular present"}
{word: the, tag: Determiner}
{word: case, tag: "Noun, singular or mass"}
{word: for, tag: Preposition or subordinating conjunction}
{word: *Anopheles*, tag: "Proper noun, singular"}
{word: *atroparvus*, tag: "Proper noun, singular"}
{word: ",", tag: ","}
{word: the, tag: Determiner}
{word: primary, tag: Adjective}
{word: vector, tag: "Noun, singular or mass"}
{word: of, tag: Preposition or subordinating conjunction}
{word: human, tag: Adjective}
{word: malaria, tag: "Proper noun, singular"}
{word: in, tag: Preposition or subordinating conjunction}
{word: Spain, tag: "Proper noun, singular"}
{word: in, tag: Preposition or subordinating conjunction}
{word: the, tag: Determiner}
{word: past, tag: "Noun, singular or mass"}
{word: ",", tag: ","}
{word: which, tag: "Wh-determiner"}
{word: has, tag: "Verb, 3rd person singular present"}
{word: recently, tag: Adverb}
{word: been, tag: "Verb, past participle"}
{word: incriminated, tag: "Verb, past participle"}
{word: in, tag: Preposition or subordinating conjunction}
{word: a, tag: Determiner}
{word: case, tag: "Noun, singular or mass"}
{word: of, tag: Preposition or subordinating conjunction}
{word: autochthonous, tag: "Proper noun, singular"}
{word: malaria, tag: "Proper noun, singular"}
{word: transmission, tag: "Proper noun, singular"}
{word: ",", tag: ","}
{word: and, tag: Coordinating conjunction}
{word: different, tag: Adjective}
{word: Culex, tag: "Proper noun, singular"}
{word: species, tag: "Noun, plural"}
{word: involved, tag: "Verb, past participle"}
{word: in, tag: Preposition or subordinating conjunction}
{word: the, tag: Determiner}
{word: transmission, tag: "Noun, singular or mass"}
{word: of, tag: Preposition or subordinating conjunction}
{word: avian, tag: Adjective}
{word: malaria, tag: "Proper noun, singular"}
{word: and, tag: Coordinating conjunction}
{word: West, tag: "Proper noun, singular"}
{word: Nile, tag: "Proper noun, singular"}
{word: and, tag: Coordinating conjunction}
{word: Usutu, tag: "Proper noun, singular"}
{word: virus, tag: "Proper noun, singular"}

In block 315, proximity-score subroutine 300 consolidates noun phrases among the tagged words corrected in block 310. For example, in one embodiment, proximity-score subroutine 300 may process a data structure such as that shown above to identify a set of noun phrases, each comprising a set of one or more nouns, such as the following.

[case, *Anopheles*, *atroparvus*]
[vector, malaria, Spain, past]
[case, autochthonous, malaria, transmission]
[Culex, species, involved, transmission, malaria]
[West, Nile]
[Usutu, virus]

In one embodiment, such a set of noun phrases may be determined by operating on a data structure such as the example corrected tagged sentence (above) using a process similar to the following greatly simplified process.

```
nounPhrase = [ ]
nounPhrases = [nounPhrase]
for {word, tag} in correctedSentence
  switch tag[0..3]
    when "Noun", "Prop" # noun or Proper noun
      nounPhrase.push provisional Verb if provisional Verb?
      provisional Verb = null
      nounPhrase.push word
    when "Verb"
      provisional Verb = word if nounPhrase.length > 0
    when "Prep", "Adje", "Dete" # preposition, adjective, determiner
      continue
    else
      provisional Verb = null
      if nounPhrase.length > 0
        nounPhrase = [ ]
        nounPhrases.push nounPhrase
```

The above code-snippet conforms to the syntax of and is operable when compiled by version 1.7.1 of the Coffeescript programming language.

In block 320, proximity-score subroutine 300 disambiguates and/or generalizes one or more nouns within one or more of the consolidated noun phrases determined in block 315. In some embodiments, proximity-score subroutine 300 may employ a lexical database for the language in which the texts are written (e.g., English). Such a lexical database may, among other things, group words into sets of synonyms, called synsets, and record various semantic relations between these synsets.

In one embodiment, proximity-score subroutine 300 may employ the WordNet lexical database, provided by the Cognitive Science Laboratory at Princeton University or Princeton, N.J. In such an embodiment, proximity-score subroutine 300 may in block 320 determine, among other things, that in the set of noun phrases shown above, the word 'transmission' is synonymous with the word 'infection'.

Similarly, in such an embodiment, proximity-score subroutine 300 may determine that the lemma or base form of the verb 'involved' is 'involve'. Consequently, proximity-score subroutine 300 may modify the set of noun phrases to include data resembling the following.

[case, *Anopheles, atroparvus*]
[vector, malaria, Spain, past]
[case, autochthonous, malaria, "transmissionlinfection"]
[Culex, species, involve, "transmissionlinfection", malaria]
[West, Nile]
[Usutu, virus]

In block 325, proximity-score subroutine 300 uses an NLP sentence splitter or similar logic to identify independent clauses in the given text.

Beginning in opening loop block 330, proximity-score subroutine 300 processes each independent clause in turn.

In subroutine block 400, proximity-score subroutine 300 calls subroutine 400 (see FIG. 4, discussed below) to measure associations between pairs of related nouns within the current independent clause.

In ending loop block 340, proximity-score subroutine 300 iterates back to opening loop block 330 to process the next independent clause, if any.

In block 345, proximity-score subroutine 300 stores, e.g., in corpus-data database 1140, noun-pair-score data structures corresponding to the given text that were updated in iterations of subroutine block 400. For example, in one embodiment when processing the noun-pairs case . . . *Anopheles*, case . . . *atroparvus*, case . . . vector, case . . . malaria, case . . . Spain, and case . . . past in the context of the example sentence, proximity-score subroutine 300 may store data similar to some or all of the following.

wordPair: case . . . *Anopheles*
score: 0.6
snippets:
  the case for *Anopheles atroparvus*
document: Malar_J_2008_Feb_26_7_35
wordPair: case . . . *atroparvus*
score: 0.6
snippets:
  "the case for *Anopheles atroparvus*, the"
document: Malar_J_2008_Feb_26_7_35
wordPair: case . . . vector
score: 0.6
snippets:
  "the case for *Anopheles atroparvus*, the primary vector of"
document: Malar_J_2008_Feb_26_7_35
wordPair: case . . . malaria
score: 0.9
snippets:
  "the case for *Anopheles atroparvus*, the primary vector of human malaria in"
  a case of autochthonous malaria transmission
document: Malar_J_2008_Feb_26_7_35
wordPair: case . . . Spain
score: 0.3
snippets:
  "the case for *Anopheles atroparvus*, the primary vector of human malaria in Spain in"
document: Malar_J_2008_Feb_26_7_35
wordPair: case . . . past
score: 0.3
snippets:
  "the case for *Anopheles atroparvus*, the primary vector of human malaria in Spain in the past, which"
document: Malar_J_2008_Feb_26_7_35

In many embodiments, proximity-score subroutine 300 may store longer contextual snippets than those illustrated above.

Subsequently, the updated measures of intra-clause proximity for the given text may be used to facilitate identifying nouns that are related to a search term and identifying the given text as being related (or not) to a given search term.

Proximity-score subroutine 300 ends in ending block 399, returning to the caller.

Figure 4:
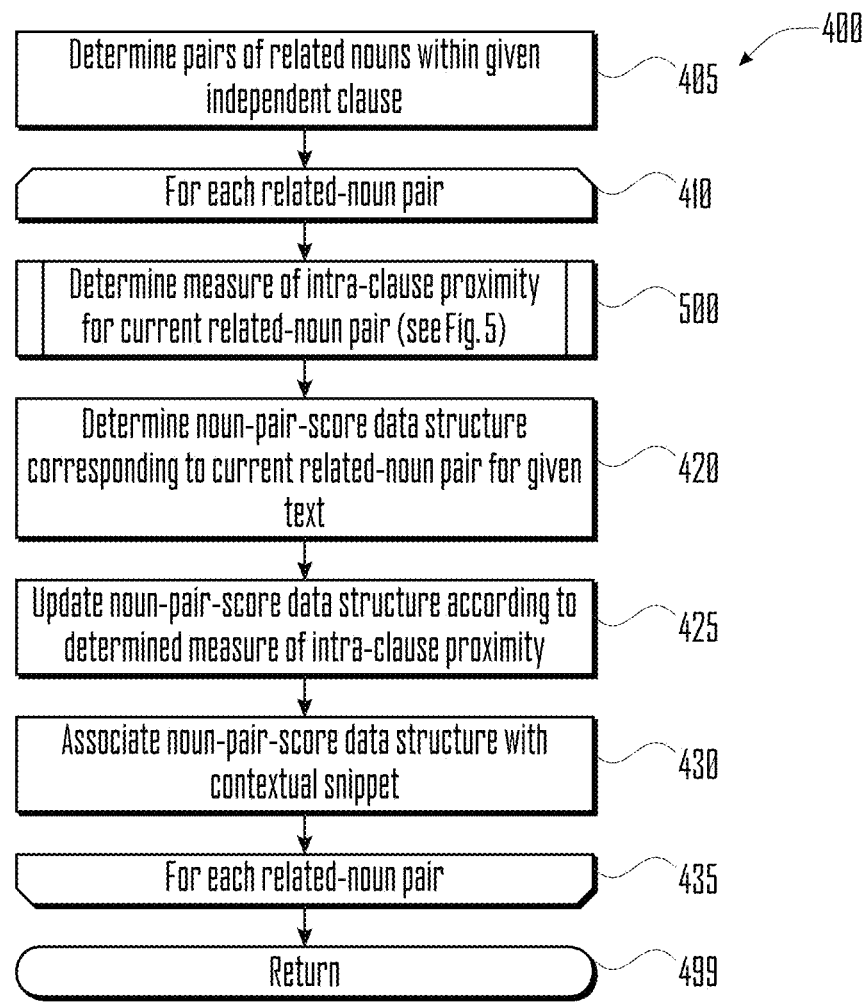
FIG. 4 illustrates an independent-clause-processing subroutine for measuring associations between nouns that appear in a given independent clause of a given text, such as may be performed by a search-service server in accordance with one embodiment.

FIG. 4 illustrates an independent-clause-processing subroutine 400 for measuring associations between nouns that appear in a given independent clause of a given text, such as may be performed by a search-service server 1100 in accordance with one embodiment.

In block 405, independent-clause-processing subroutine 400 determines pairs of related nouns within the given independent clause. For example, in one embodiment, each noun within each of the noun phrases determined above may be determined to be related to each noun that appears subsequently in the same independent clause. For example, in the example set of noun phrases shown above, independent-clause-processing subroutine 400 may determine a set of related-noun pairs including pairs similar to the following (in which two out of every three pairs have been omitted for brevity).

case . . . *Anopheles*
case . . . malaria
case . . . autochthonous
case . . . species
case . . . Nile

*Anopheles* . . . *atroparvus*
*Anopheles* . . . Spain
*Anopheles* . . . autochthonous
*Anopheles* . . . species
*Anopheles* . . . Nile
*atroparvus* . . . vector
*atroparvus* . . . past
"*atroparvus* . . . (transmission|infection)"
*atroparvus* . . . involve
*atroparvus* . . . Usutu
vector . . . Spain
vector . . . autochthonous
vector . . . species
vector . . . Nile
malaria . . . Spain
malaria . . . autochthonous
malaria . . . species
malaria . . . Nile
Spain . . . past
Spain . . . malaria
Spain . . . species
Spain . . . Nile
past . . . case
"past . . . (transmission|infection)"
past . . . involve
past . . . Usutu
"autochthonous . . . (transmission|infection)"
autochthonous . . . involve
autochthonous . . . Usutu
"(transmission|infection) . . . species"
"(transmission|infection) . . . West"
"(transmission|infection) . . . virus"
"Culex . . . (transmission|infection)"
Culex . . . Nile
species . . . involve
species . . . West
species . . . virus
involve . . . West
involve . . . virus
West . . . virus
Usutu . . . virus Beginning in opening loop block 410, independent-clause-processing subroutine 400 processes each related-noun pair in turn.

In subroutine block 500, independent-clause-processing subroutine 400 calls subroutine 500 (see FIG. 5, discussed below) to determine a measure of intra-clause proximity for the current related-noun pair. In some embodiments, a measure of intra-clause proximity indicates the strength and/or degree of association between the two nouns of the current related-noun pair in the given independent clause, considering factors such as the word-distance between the two nouns and/or the presence of intervening prepositions or other linking words. In one embodiment, a measure of intra-clause proximity may range from 0 (indicating that two nouns do not appear in the same independent clause) to 1 (indicating that the two nouns are immediately adjacent in an independent clause). Between those extremes, there may be intermediate values indicating that the two terms are either not linked (e.g. 0.3) or linked (e.g., 0.6) by an intervening preposition or other linking word. In other embodiments, other suitable scoring schemes may be equivalently employed.

For example, in one embodiment, when processing a noun-pair consisting of the words '*Anopheles*' and '*atroparvus*', subroutine 500 may return a score of 1 because the members of the pair are adjacent to each other in the snippet ' . . . for *Anopheles atroparvus*, the . . . '.

Similarly, when processing a noun-pair consisting of the words 'case' and '*Anopheles*', subroutine 500 may return a score of 0.6 because the members of the pair are linked to each other by a linking preposition in the snippet ' . . . the case for *Anopheles atroparvus* . . . '.

For another example, when processing a noun-pair consisting of the words 'autochthonous' and 'species', subroutine 500 may return a score of 0.3 because the members of the pair are neither adjacent nor linked to each other in the snippet ' . . . of autochthonous malaria transmission, and different Culex species involved . . . '.

Relatedly, when processing a noun-pair consisting of the words 'case' and 'malaria', subroutine 500 may return a score of 0.9 because the members of the pair have a weak relation in one snippet and a linking relationship in another snippet, namely ' . . . the case for *Anopheles atroparvus*, the primary vector of human malaria in . . . ' and ' . . . a case of autochthonous malaria transmission . . . '.

In block 420, independent-clause-processing subroutine 400 determines a word-pair-score (in this example, a noun-pair-score) data structure corresponding to the current related-word pair (in this example a related-noun pair) for the given text. In many cases, the current related-word pair may also exist in other previously-processed independent clauses elsewhere in the given text. In such cases, a word-pair-score data structure corresponding to the current related-word pair may already exist, in which case, independent-clause-processing subroutine 400 identifies and obtains the existing word-pair-score (in this example, noun-pair-score) data structure. Otherwise, if independent-clause-processing subroutine 400 has not previously encountered the current related-word (e.g., related-noun) pair in the given text, independent-clause-processing subroutine 400 may initialize a new word-pair-score (e.g., noun-pair-score) data structure for the current related-word pair in the given text.

In various embodiments, a word-pair-score data structure may include data slots or fields (including structured or unstructured records, pointers, or other means of associating data) for identifying the members of the current related-noun pair, for indicating a measure of intra-clause proximity, and for providing context for places in which the current related-noun pair appears in the given text.

In block 425, independent-clause-processing subroutine 400 updates the noun-pair-score data structure determined in block 420 according to the measure of intra-clause proximity determined in subroutine block 500.

In block 430, independent-clause-processing subroutine 400 associates the noun-pair-score data structure with a contextual snippet providing context from the independent clause in the given text in which the nouns of the current related-noun pair appear together. In some embodiments, a contextual snippet may include the sentence in which the nouns appear, as well as zero or more surrounding sentences.

In block 435, independent-clause-processing subroutine 400 is performed for each related-noun-pair.

Independent-clause-processing subroutine 400 ends in ending block 499, returning to the caller.

Figure 5:
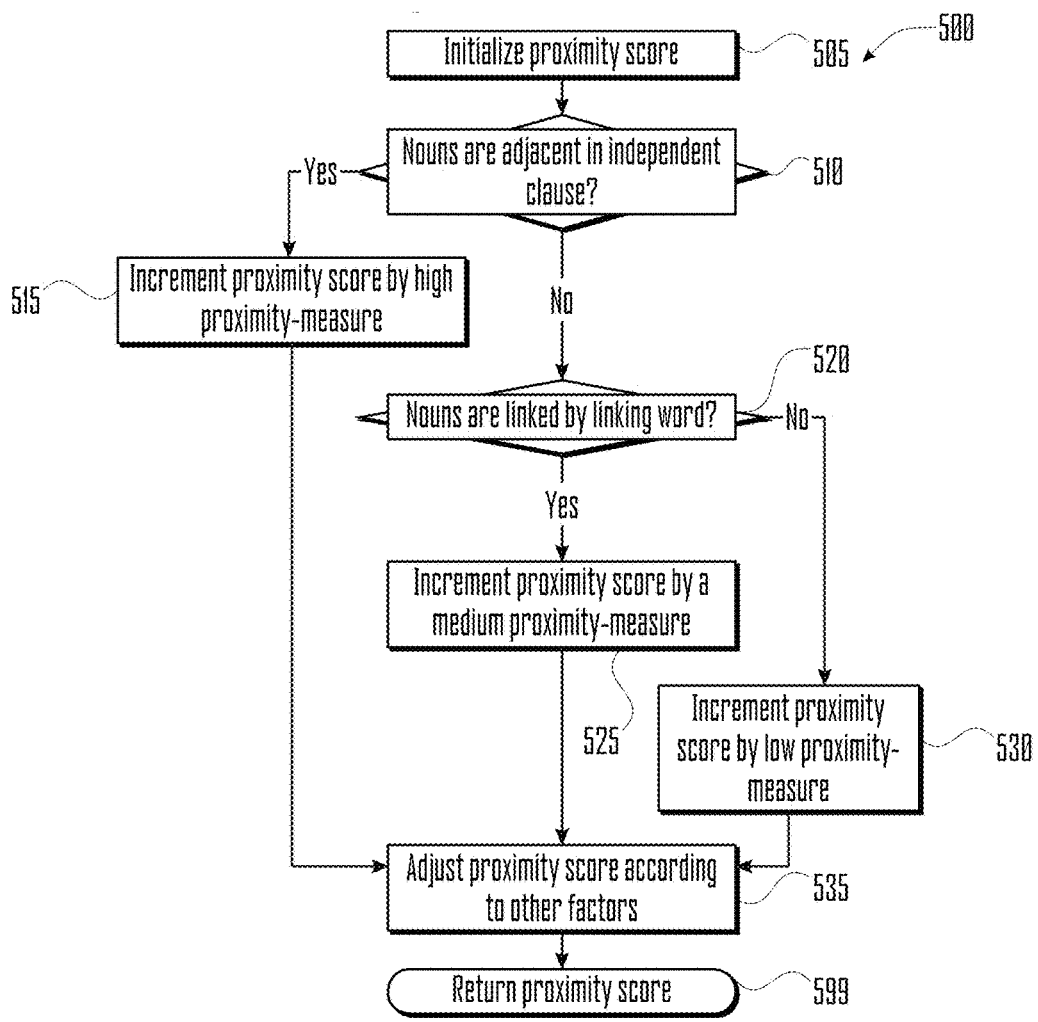
FIG. 5 illustrates a scoring subroutine for determining a measure of intra-clause proximity based on given relationships between a given pair of nouns in a given independent clause, such as may be performed by a search-service server in accordance with one embodiment.

FIG. 5 illustrates a scoring subroutine 500 for determining a measure of intra-clause proximity based on given relationships between a given pair of nouns in a given independent clause, such as may be performed by a search-service server 1100 in accordance with one embodiment.

As discussed further below, unlike many search engines, scoring subroutine 500 does not consider prepositions and other linking words to be 'stop words' that should be excluded and/or ignored. Rather, as discussed below, scoring subroutine 500 uses such linking words to signal a relationship between certain words (e.g., nouns).

In block 505, scoring subroutine 500 initializes a proximity score data structure to an initial value (e.g. 0).

In decision block 510, scoring subroutine 500 determines whether the nouns are adjacent or nearly adjacent in independent clause. If so, then scoring subroutine 500 proceeds to block 515; otherwise, scoring subroutine 500 proceeds to decision block 520.

For example, in one embodiment, when the given pair of nouns includes '*Anopheles*' and '*atroparvus*', subroutine 500 may determine that the members of the pair are adjacent to each other in the snippet ' . . . for *Anopheles atroparvus*, the . . . '.

In block 515, scoring subroutine 500 increments the proximity score by a high proximity-measure. For example, in one embodiment, when the given pair of nouns includes the words '*Anopheles*' and '*atroparvus*', subroutine 500 may increment the proximity score by 1. In other embodiments, scoring subroutine 500 may increment the proximity score by a different value to indicate a high proximity-measure.

In decision block 520, scoring subroutine 500 determines whether the nouns are linked by linking word. If so, then scoring subroutine 500 proceeds to block 525; otherwise, scoring subroutine 500 proceeds to block 530.

For example, in one embodiment, when the given pair of nouns includes 'case' and '*Anopheles*', subroutine 500 may determine that the members of the pair are linked to each other by a linking preposition in the snippet ' . . . the case for *Anopheles atroparvus* . . . '.

In block 525, scoring subroutine 500 increment proximity score by a medium proximity-measure. For example, in one embodiment, when the given pair of nouns includes the words 'case' and '*Anopheles*', subroutine 500 may increment the proximity score by 0.6. In other embodiments, scoring subroutine 500 may increment the proximity score by a different value to indicate a medium proximity-measure.

When the given pair of nouns are neither adjacent nor linked, in block 530, scoring subroutine 500 increments the proximity score by a low proximity-measure.

For example, in one embodiment, when the given pair of nouns includes 'autochthonous' and 'species', subroutine 500 may determine that the members of the both appear in the snippet ' . . . of autochthonous malaria transmission, and different Culex species involved . . . ', but pair are neither adjacent nor linked to each other. Consequently, in block 530, scoring subroutine 500 may increment the proximity score by 0.3. In other embodiments, scoring subroutine 500 may increment the proximity score by a different value to indicate a low proximity-measure.

In block 535, scoring subroutine 500 optionally adjusts the proximity score according to one or more other factors. For example, in some embodiments, a particular term may be determined to be particularly relevant (or irrelevant) to the text in which the given independent clause appears. If so, scoring subroutine 500 may adjust the proximity score in block 535 to reflect that particular relevance (or irrelevance) when the particular term is a member of the given pair of nouns.

In various embodiments, relevance (or irrelevance) may be determined based on editorial input, such as when a user selects or deselects a particular relating term to filter search results.

Alternately, in some embodiments, a statistical model of the distribution of terms in a text may indicate that certain terms relate to the subject of the text. For example, in many texts, the most commonly used English words (e.g., 'the', 'and', and the like) have a very high frequency and therefore describe little about the content of the text. By contrast, proper nouns tend to have a low frequency in a text, and may also describe little about the content of the text. However, terms that appear at the mean of the frequency distribution may be related to the subject of a text. By statistically plotting the Poisson distribution of terms in a text and taking into account the mean, a set of probable subjects and/or categories may be obtained.

In ending block 599, scoring subroutine 500 ends, returning the proximity score to the caller.

Figure 6:
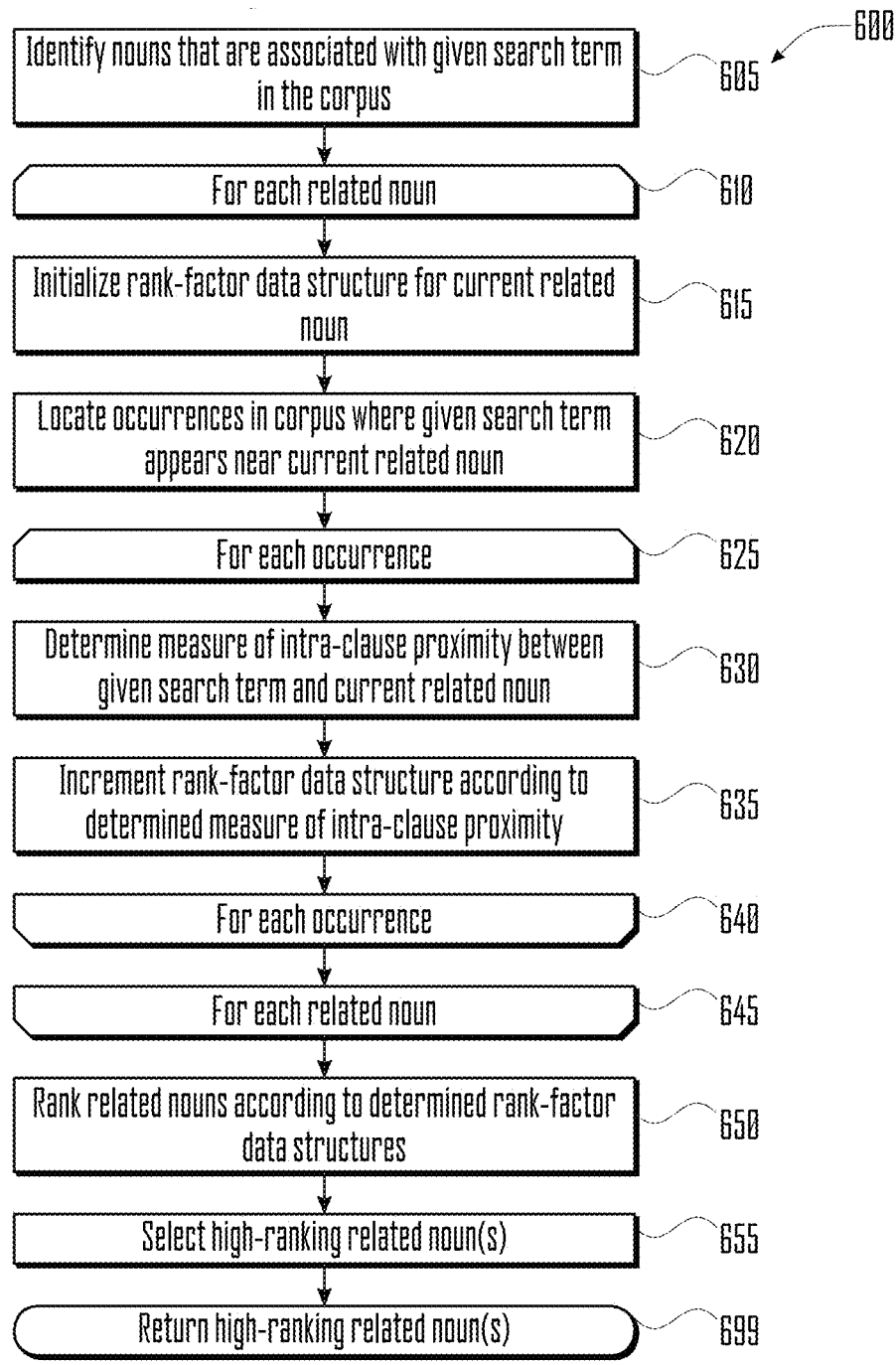
FIG. 6 illustrates a related-term identification subroutine for identifying related noun that are associated with a given search term, such as may be performed by a search-service server in accordance with one embodiment.

FIG. 6 illustrates a related-term identification subroutine 600 for identifying one or more related word(s) (in this example, noun(s)) that are associated with a given search term, such as may be performed by a search-service server 1100 in accordance with one embodiment.

Using a data structure describing pairs of nouns that appear in texts of a corpus, in block 605, related-term identification subroutine 600 identifies one or more nouns that are associated with the given search term in one or more texts of the corpus.

For example, in one embodiment, a user may enter a search term such as 'malaria'. Using data similar to that described above in reference to proximity-score subroutine 300 (see FIG. 3, discussed above) and/or independent-clause-processing subroutine 400 (see FIG. 4, discussed above), related-term identification subroutine 600 may determine that 'malaria' appears in at least one text as part of the following related-noun pairs, each term of which appear near each other in at least one place in at least one text. The related terms may be, for example, filtered based on the number of results (so as to select, e.g., the top 10 or 15) or may be selected by a statistical heuristic such as a Poisson distribution.

malaria . . . drug
malaria . . . antigen
malaria . . . reagent
malaria . . . virus
gene . . . malaria
protein . . . malaria
malaria . . . cell
malaria . . . disease
bacteria . . . malaria From such related-noun-pair data, related-term identification subroutine 600 may determine that the following nouns are associated with the search term 'malaria' in the corpus: 'drug', 'antigen', 'reagent', 'virus', 'gene', 'protein', 'cell', 'disease', and 'bacteria'. In some embodiments, one or more noun pairs selected by a statistical heuristic can be chosen as concept types that the search system can use to classify found concepts.

Beginning in opening loop block 610, related-term identification subroutine 600 processes each related noun in turn.

In block 615, related-term identification subroutine 600 initializes a rank-factor data structure for the current related noun to an initial value (e.g. 0).

In block 620, related-term identification subroutine 600 locates occurrences in one or more texts of the corpus where the given search term appears near the current related noun. For example, using data similar to the noun-pair-score data structures shown in reference to block 345 (see FIG. 3, discussed above), related-term identification subroutine 600 may determine that the search term and the current related noun occur near each other in one or more places across one or more texts of the corpus.

Beginning in opening loop block 625, related-term identification subroutine 600 processes each occurrence in turn.

In block 630, related-term identification subroutine 600 determines a measure of intra-clause proximity between the given search term and the current related noun. For example, using data similar to the noun-pair-score data structures shown in reference to block 345 (see FIG. 3, discussed above), related-term identification subroutine 600 may determine that a given occurrence of the search term and the current related noun was scored with a certain measure of intra-clause proximity using a scoring process such as that described in reference to independent-clause-processing subroutine 400 (see FIG. 4, discussed above) and/or scoring subroutine 500 (see FIG. 5, discussed above).

In block 635, related-term identification subroutine 600 increments the rank-factor data structure initialized in block 615 according to the measure of intra-clause proximity determined in block 630.

In ending loop block 640, related-term identification subroutine 600 iterates back to opening loop block 625 to process the next occurrence, if any.

In ending loop block 645, related-term identification subroutine 600 iterates back to opening loop block 610 to process the next related noun, if any.

Once cumulative, corpus-wide measures of intra-clause proximity have been accumulated for each related noun in iterations of block 635, in block 650, related-term identification subroutine 600 ranks the related nouns according to the determined rank-factor data structures.

In block 655, related-term identification subroutine 600 selects one or more high-ranking related nouns based at least in part on the ranking performed in block 650.

In ending block 699, related-term identification subroutine 600 ends, returning the one or more high-ranking related noun(s) to the caller.

Figure 7:
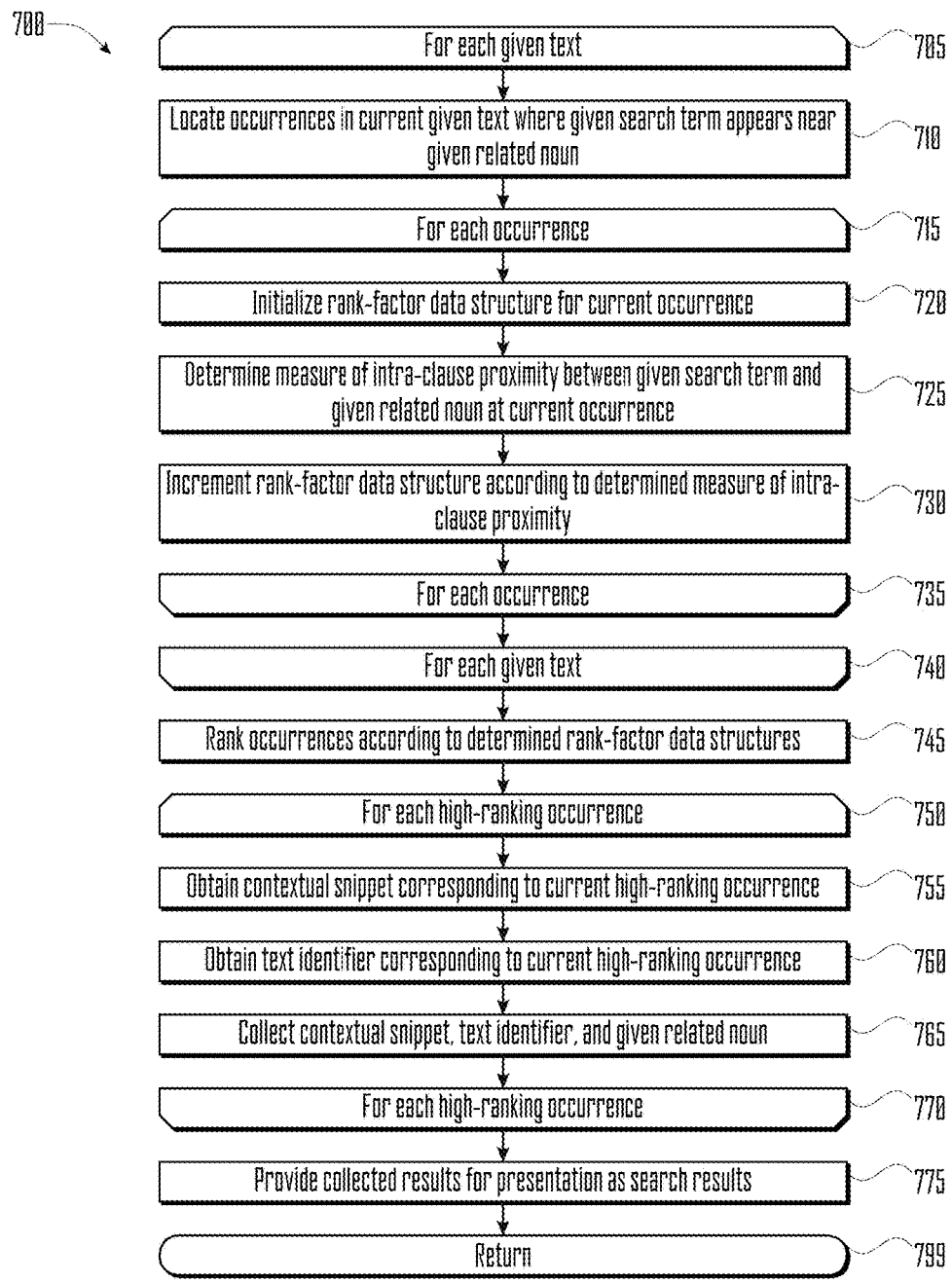
FIG. 7 illustrates a results subroutine for providing, for presentation as search results, data associated with a given text, a given search term, and a given related noun, such as may be performed by a search-service server in accordance with one embodiment.

FIG. 7 illustrates a results subroutine 700 for providing, for presentation as search results, data associated with a given text, a given search term, and a given related word (in this example, a noun), such as may be performed by a search-service server 1100 in accordance with one embodiment.

Beginning in opening loop block 705, results subroutine 700 processes each given text in turn.

In block 710, results subroutine 700 locates occurrences in the current given text where the given search term appears near the given related noun. For example, using data similar to the noun-pair-score data structures shown in reference to block 345 (see FIG. 3, discussed above), results subroutine 700 may determine that the given search term and the given related noun occur near each other in one or more places in the given text.

Beginning in opening loop block 715, results subroutine 700 processes each occurrence in turn.

In block 720, results subroutine 700 initializes a rank-factor data structure for the current occurrence to an initial value (e.g. 0).

In block 725, results subroutine 700 determines a measure of intra-clause proximity between the given search term and the given related noun at the current occurrence. For example, using data similar to the noun-pair-score data structures shown in reference to block 345 (see FIG. 3, discussed above), results subroutine 700 may determine that a the current occurrence of the given search term and the given related noun were scored with a certain measure of intra-clause proximity using a scoring process such as that described in reference to independent-clause-processing subroutine 400 (see FIG. 4, discussed above) and/or scoring subroutine 500 (see FIG. 5, discussed above).

In block 730, results subroutine 700 increments the rank-factor data structure initialized in block 720 according to the measure of intra-clause proximity determined in block 725.

In ending loop block 735, results subroutine 700 iterates back to opening loop block 715 to process the next occurrence, if any.

In ending loop block 740, results subroutine 700 iterates back to opening loop block 705 to process the next given text, if any.

In block 745, results subroutine 700 ranks the occurrences according to the rank-factor data structures incremented in iterations of block 730.

Beginning in opening loop block 750, results subroutine 700 processes each high-ranking occurrence in turn.

In block 755, results subroutine 700 obtains a contextual snippet corresponding to the current high-ranking occurrence.

In block 760, results subroutine 700 obtains a text identifier corresponding to the current high-ranking occurrence.

In block 765, results subroutine 700 collects the contextual snippet, the text identifier identifying the text in which the contextual snippet occurs, and the given related noun.

In ending loop block 770, results subroutine 700 iterates back to opening loop block 750 to process the next high-ranking occurrence, if any.

In block 775, results subroutine 700 provides the collected results for presentation as search results.

Results subroutine 700 ends in ending block 799, returning to the caller.

FIG. 8 illustrates an example search-results user-interface 800 showing three search-results for the search term 'malaria' and the related-noun 'drug', in accordance with one embodiment.

Related noun display 805 indicates that the subsequent set of results are clustered and/or categorized according to the related-noun 'drug'.

Score display 810 indicates that the related-noun 'drug' has a cumulative, corpus-wide intra-clause proximity-measure of 294.

Noun phrase display 815 indicates that the current search result includes the related-noun 'drug' as part of the noun phrase, 'Malaria Drug Resistance MDR'.

Contextual snippet display 820 provides the context in which the noun phrase, 'Malaria Drug Resistance MDR', appears in the current search-result text.

Text control 825 includes a link with an identifier identifying the complete text in which the noun phrase, 'Malaria Drug Resistance MDR' appears.

Noun phrase display 830 indicates that the current search result includes the related-noun 'drug' as part of the noun phrase, 'common malaria drug'.

Contextual snippet display 835 provides the context in which the noun phrase, 'common malaria drug', appears in the current search-result text.

Text control 840 includes a link with an identifier identifying the complete text in which the noun phrase, 'common malaria drug' appears.

Noun phrase display 845 indicates that the current search result includes the related-noun 'drug' as part of the noun phrase, 'antimalarial drug'.

Contextual snippet display 850 provides the context in which the noun phrase, 'antimalarial drug', appears in the current search-result text.

Text control 855 includes a link with an identifier identifying the complete text in which the noun phrase, 'antimalarial drug' appears.

FIG. 9 illustrates an example search-results user-interface 900 showing four search-results for the search term 'malaria' and the related-noun 'reagent', in accordance with one embodiment.

Related noun display 905 indicates that the subsequent set of results are clustered and/or categorized according to the related-noun 'reagent'.

Score display 910 indicates that the related-noun 'reagent' has a cumulative, corpus-wide intra-clause proximity-measure of 257.

Noun phrase display 915 indicates that the current search result includes the related-noun 'reagent' as part of the noun phrase, 'Reference Reagent Resource Center MR4'.

Contextual snippet display 920 provides the context in which the noun phrase, 'Reference Reagent Resource Center MR4', appears in the current search-result text.

Text control 925 includes a link with an identifier identifying the complete text in which the noun phrase, 'Reference Reagent Resource Center MR4' appears.

Noun phrase display 930 indicates that the current search result includes the related-noun 'reagent' as part of the noun phrase, 'Reference Reagent Resource Center MR4'.

Contextual snippet display 935 provides the context in which the noun phrase, 'Reference Reagent Resource Center MR4', appears in the current search-result text.

Text control 940 includes a link with an identifier identifying the complete text in which the noun phrase, 'Reference Reagent Resource Center MR4' appears.

Noun phrase display 945 indicates that the current search result includes the related-noun 'reagent' as part of the noun phrase, 'Reference Reagent Resource Center MR4'.

Contextual snippet display 950 provides the context in which the noun phrase, 'Reference Reagent Resource Center MR4', appears in the current search-result text.

Text control 955 includes a link with an identifier identifying the complete text in which the noun phrase, 'Reference Reagent Resource Center MR4' appears.

Noun phrase display 960 indicates that the current search result includes the related-noun 'reagent' as part of the noun phrase, 'Malaria Research Reference Reagent Resource Center MR4'.

Contextual snippet display 965 provides the context in which the noun phrase, 'Malaria Research Reference Reagent Resource Center MR4', appears in the current search-result text.

Figure 10:
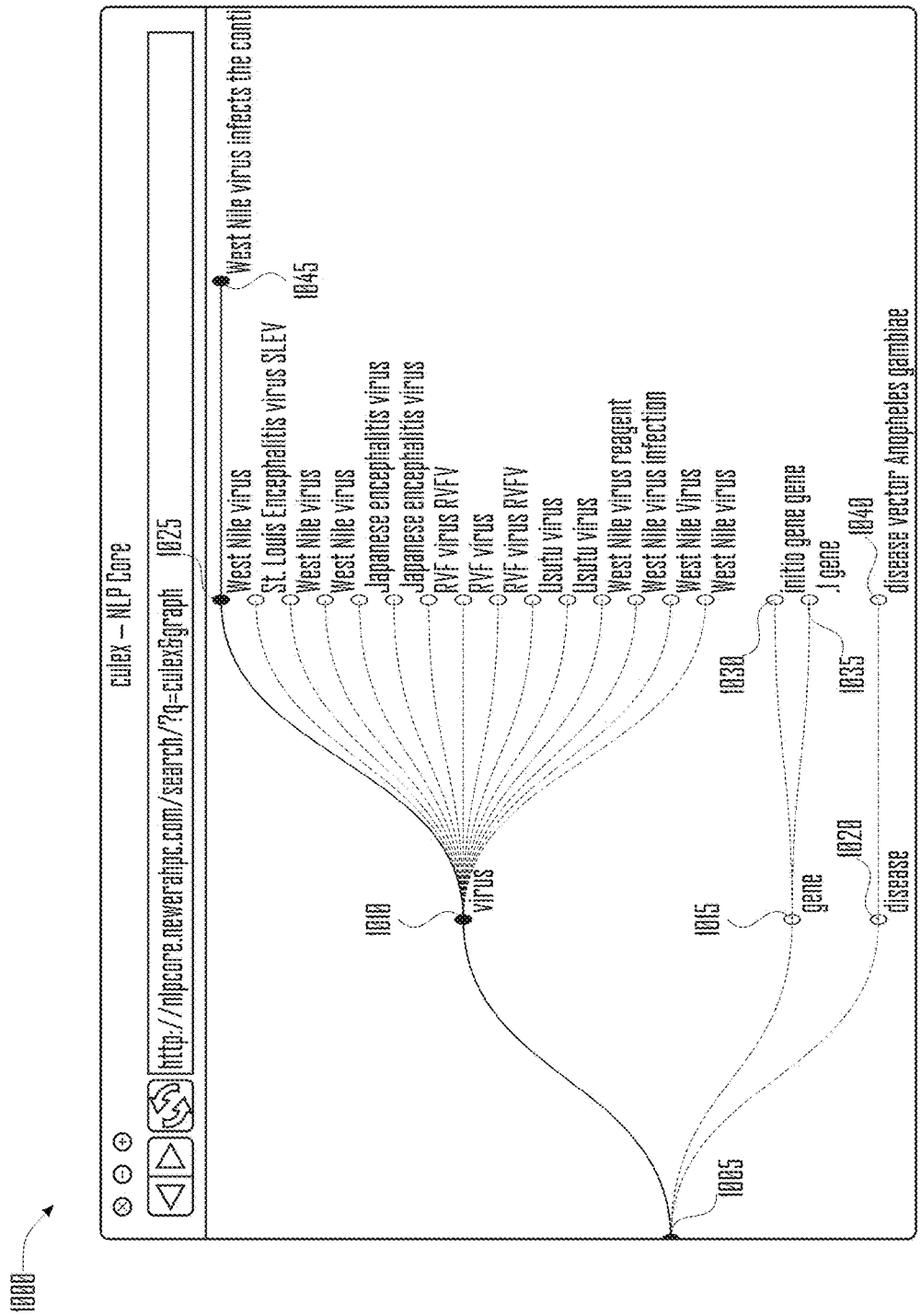
FIG. 10 illustrates an example alternative, graph-based search-results user-interface showing search-results related to the search term 'culex', in accordance with one embodiment.

FIG. 10 illustrates an example alternative, graph-based search-results user-interface 1000 showing search-results related to the search term 'culex', in accordance with one embodiment.

Results 1005 represents a root node for all search-results related to the search term 'culex' in a corpus.

Selected category node 1010 represents a category or cluster of one or more search-results in which the search term 'culex' appears near the related noun 'virus'. In the illustrated search-results user-interface 1000, the cluster of search-results includes 15 results in which the related noun 'virus' appears in a text as part of one of the noun phrases, 'West Nile virus', 'St. Louis Encephalitis virus SLEV', 'Japanese encephalitis virus', 'RVF virus RVFV', 'RVF virus', 'Usutu virus', 'West Nile virus reagent', or 'West Nile virus infection'.

Unselected category node 1015 represents a category or cluster of one or more search-results in which the search term 'culex' appears near the related noun 'gene'.

Unselected category node 1020 represents a category or cluster of one or more search-results in which the search term 'culex' appears near the related noun 'disease'.

Selected entity node 1025 represents a search-result (of one or more search results) in which the related noun 'virus' appears as part of the noun phrase 'West Nile virus'.

Unselected entity node 1030 represents a search-result (of one or more search-results) in which the related noun 'gene' appears as part of the noun phrase 'initio gene gene'.

Unselected entity node 1035 represents a search-result (of one or more search-results) in which the related noun 'gene' appears as part of the noun phrase '0.1 gene'.

Unselected entity node 1040 represents a search-result (of one or more search-results) in which the related noun 'disease' appears as part of the noun phrase 'disease vector *Anopheles gambiae*'.

Contextual snippet node 1045 depicts a contextual snippet in which the selected noun phrase, 'West Nile virus', appears in a text.

Figure 11:
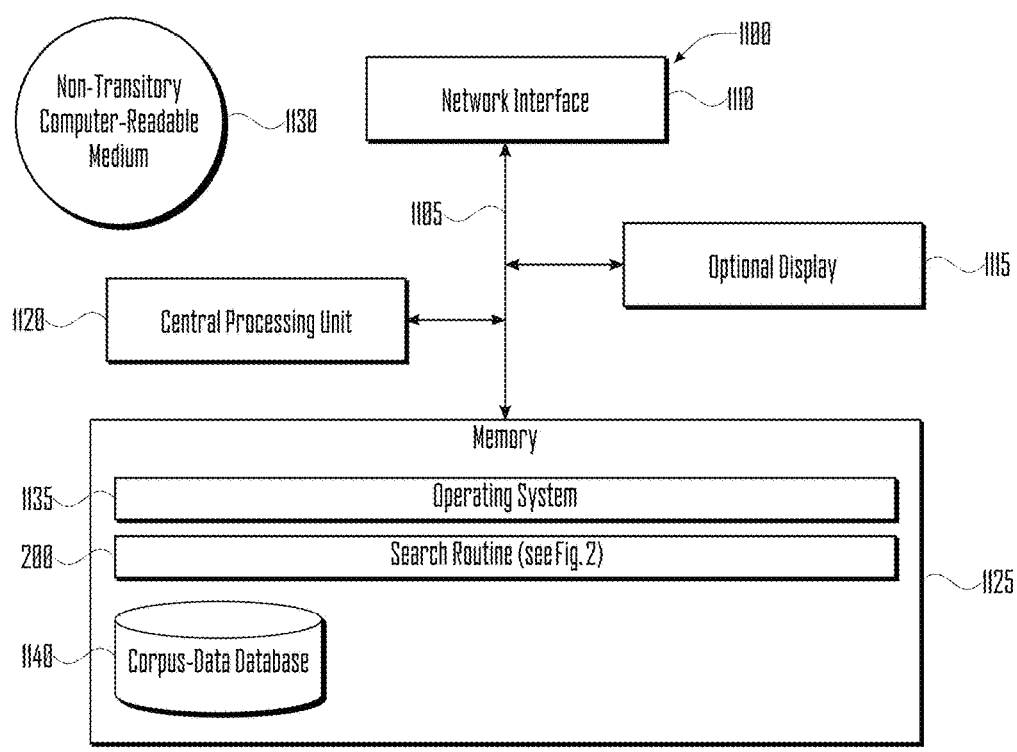
FIG. 11 illustrates several components of an example search-service server in accordance with one embodiment.

FIG. 11 illustrates several components of an example search-service server in accordance with one embodiment. In various embodiments, search-service server 1100 may include a desktop PC, server, workstation, mobile phone, laptop, tablet, set-top box, appliance, or other computing device that is capable of performing operations such as those described herein. In some embodiments, search-service server 1100 may include many more components than those shown in FIG. 11. However, it is not necessary that all of these generally conventional components be shown in order to disclose an illustrative embodiment.

In various embodiments, search-service server 1100 may comprise one or more physical and/or logical devices that collectively provide the functionalities described herein. In some embodiments, search-service server 1100 may comprise one or more replicated and/or distributed physical or logical devices.

In some embodiments, search-service server 1100 may comprise one or more computing resources provisioned from a "cloud computing" provider, for example, Amazon Elastic Compute Cloud ("Amazon EC2"), provided by Amazon.com, Inc. of Seattle, Wash.; Google Cloud Platform, provided by Google Inc. of Mountain View, Calif.; Windows Azure, provided by Microsoft Corporation of Redmond, Wash., and the like.

Search-service server 1100 includes a bus 1105 interconnecting several components including a network interface 1110, an optional display 1115, a central processing unit 1120, and a memory 1125.

Memory 1125 generally comprises a random access memory ("RAM") and permanent non-transitory mass storage device, such as a hard disk drive or solid-state drive. Memory 1125 stores program code for a search routine 200 for searching a corpus of texts relating to a domain of knowledge (see FIG. 2, discussed above). In addition, the memory 1125 also stores an operating system 1135.

These and other software components may be loaded into memory 1125 of search-service server 1100 using a drive mechanism (not shown) associated with a non-transitory computer-readable medium 1130, such as a floppy disc, tape, DVD/CD-ROM drive, memory card, or the like.

Memory 1125 also includes corpus-data database 1140. In some embodiments, search-service server 1100 may communicate with corpus-data database 1140 via network interface 1110, a storage area network ("SAN"), a high-speed serial bus, and/or via the other suitable communication technology.

In some embodiments, corpus-data database 1140 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Aspects of the system can be embodied in a specialized or special purpose computing device or data processor that is specifically programmed, configured, or constructed to perform one or more of the computer-executable instructions explained in detail herein. Aspects of the system can also be practiced in distributed computing environments where tasks or modules are performed by remote processing devices that are linked through a communications network, such as a local area network (LAN), wide area network (WAN), or the Internet. In a distributed computing environment, modules can be located in both local and remote memory storage devices.

The following Figures describe additional computing systems and methods for determining related word pairs and associating various attribute data with the word pairs to provide improved search results. FIGS. 12-16 illustrate approaches for determining word pairs within a text, associating a word pair with user feedback and dictionary overlay information as well as contextual information, and storing the entry for the word pair in an updated word-pair feature vector data structure. FIGS. 17-18 illustrate a data structure mechanism for storing word pairs along with their attributes derived from various sources. Finally, FIGS. 19-22 illustrate an example user interface for a search system according to one of the possible embodiments.

Figure 12:
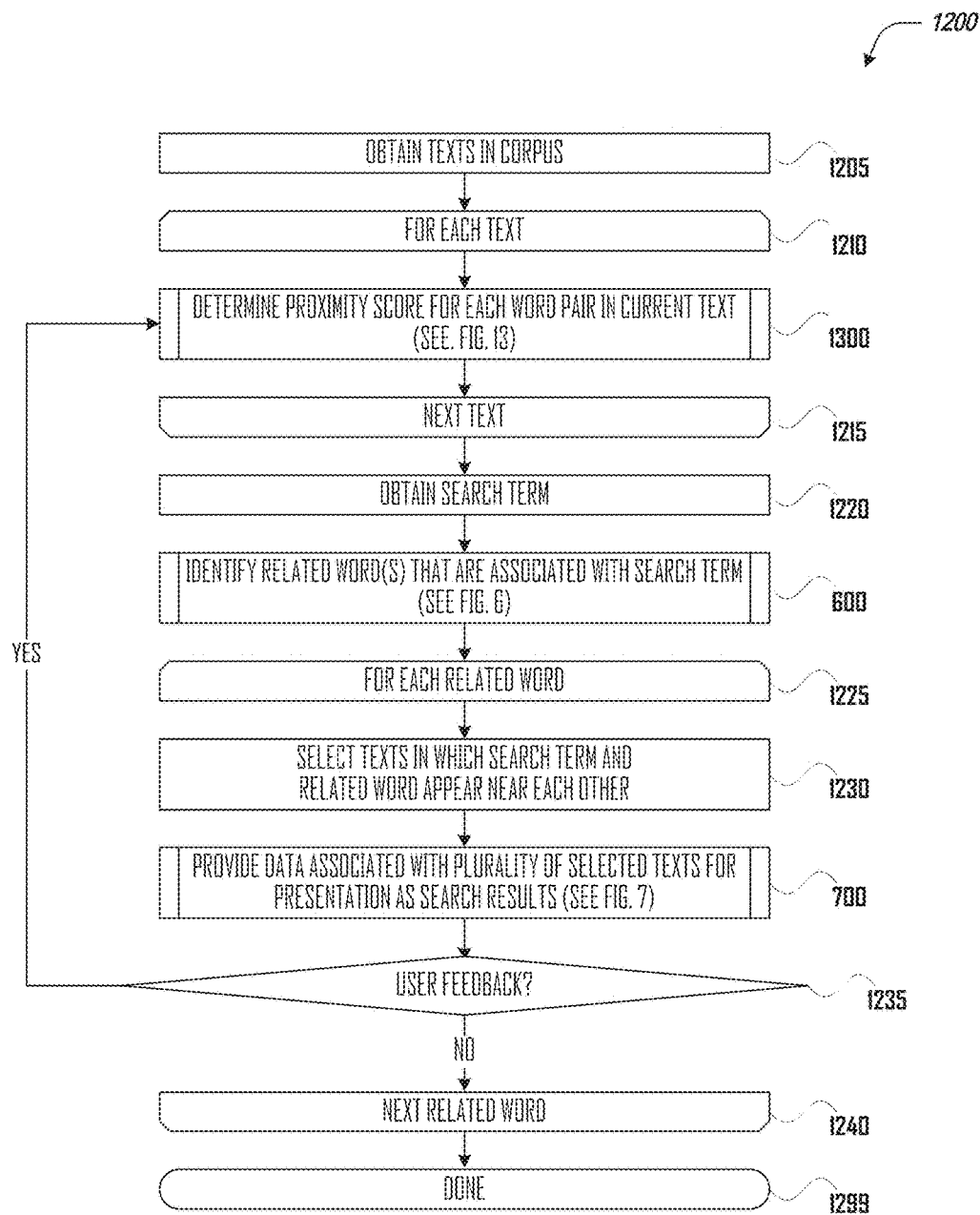
FIG. 12 illustrates a search routine incorporating a feedback loop.

FIG. 12 illustrates a search routine 1200 incorporating a feedback loop for searching a corpus of texts relating to a domain of knowledge, such as may be performed by a search-service server 1100 in accordance with one embodiment. The feedback loop enables search routine 1200 to provide improved results.

In block 1205, search routine 1200 obtains the contents of a set of texts that make up a corpus that is directed or related to some domain of knowledge. Beginning in opening loop block 1210, search routine 1200 processes each text in turn.

In subroutine block 1300, search routine 1200 calls subroutine 1300 (see FIG. 13, discussed below) to determine a proximity score for word pairs in the current text of the corpus. As described above in connection with FIG. 3, a proximity score measures associations between a pair of words that appear in the current text and that are semantically related to the domain of knowledge.

In some embodiments, a proximity score measures associations between a first pair of words, on the one hand, and a third word, on the other hand. Thus, word pairs can be cumulative and are not limited to two words. For example, a word can be paired with a nearby word, and the pair can be paired with another nearby word, creating a phrase. In various embodiments, such a phrase can contain one or more words up to a distance specified as a parameter to the computational engine. For example, the proximity-score subroutine 1300 can determine one or more proximity scores for a phrase with more than two words, such as "Great Train Robbery". In this example, the pair of words "Great" (adjective) and "Robbery" (noun) capture the features of the entire phrase, including the center word "Train". Accordingly, the system (e.g., the search-service server 1100) can generate proximity scores measuring not only pairwise associations between exactly two words, but also proximity scores between a pair of words (e.g., "Great", "Robbery") and another word (e.g., "Train"). As another example, the system can measure associations between two pairs of words (e.g., "Great", "Robbery" and "Train", "Robbery"; or "Great", "Train" and "bank", "robbery").

In ending loop block 1215, search routine 1200 iterates back to opening loop block 1210 to process the next text, if any.

After each text of the corpus has been processed, in block 1220, search routine 1200 obtains a search term.

In subroutine block 600, search routine 1200 calls subroutine 600 (see FIG. 6, discussed above) to identify, based at least in part on a multiplicity of word-pair proximity scores, one or more related words that are strongly associated with the search term within a corpus. In some embodiments, the word pairs may not be noun pairs.

Beginning in opening loop block 1225, search routine 1200 processes each related word identified in subroutine block 600.

In block 1230, search routine 200 selects one or more texts from the corpus in which the search term and the related word appear near each other in at least one place.

In subroutine block 700, search routine 1200 provides data associated with the plurality of selected texts for presentation as search results. For example, in one embodiment, search routine 1200 may provide data from which the computational engine may generate and present to the user a portion of an interface such as search-results user-interface 1900 (see FIG. 19, discussed below).

Figure 19:
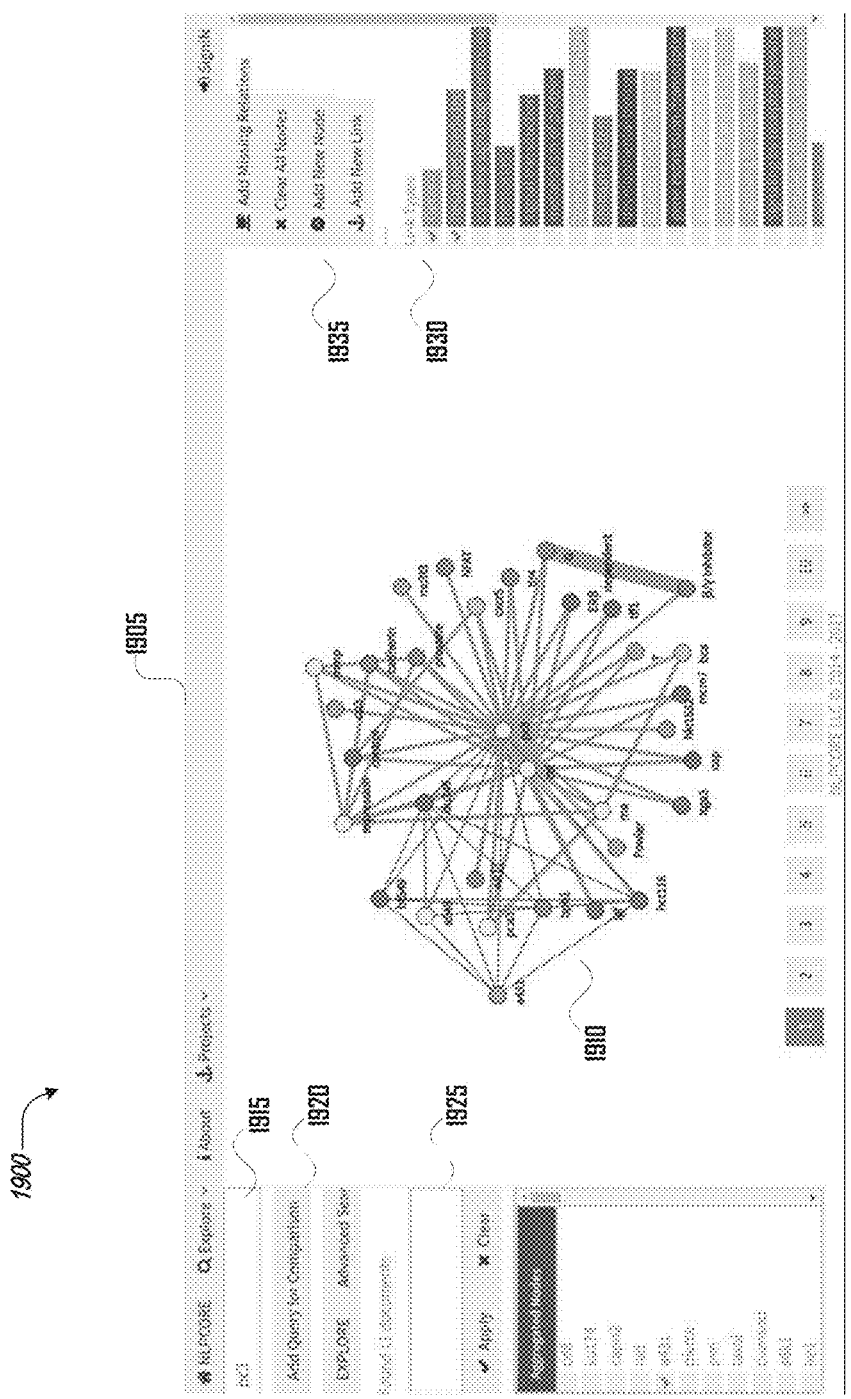
FIG. 19 illustrates a screenshot of search results presented in a graph or interactive radial map interface.

In various embodiments, user feedback regarding the presented related words may be used to categorize and/or filter search results. In some embodiments, related words may be presented to the searching user (e.g., using a graph or interactive radial map interface, such as illustrated in FIG. 19) such that the user may indicate and/or promote particular related words that he or she believes are most relevant, demote related words that are not relevant, add a word with a link to another related word or the search term, categorize words, rate match quality, etc. In some embodiments, such user feedback may be incorporated into subsequent searches for similar terms.

In decision block 1235, the search routine 1200 determines whether user feedback has been received regarding the related word in the presented search results. If no feedback has been received, then the search routine 1200 proceeds to ending loop block 1240. If, however, the user has provided feedback regarding the related word, then the search routine 1200 instead proceeds to subroutine block 1300 to re-determine a proximity score for word pairs in the current text of the corpus, incorporating the user feedback. In some embodiments, the search routine 1200 sets a flag for re-determining proximity scores at a later time, such as upon receiving all feedback from a user or on a periodic (e.g., hourly or daily) update schedule.

In various embodiments, user feedback provided as a new search result node or a new relationship between search result nodes is recorded by the search system (e.g., added to a word-pair feature vector data structure), such as described below in further detail in connection with FIG. 16.

In ending loop block 1240, search routine 1200 iterates back to opening loop block 1225 to process the next related word, if any.

Search routine 1200 ends in ending block 1299.

Figure 13:
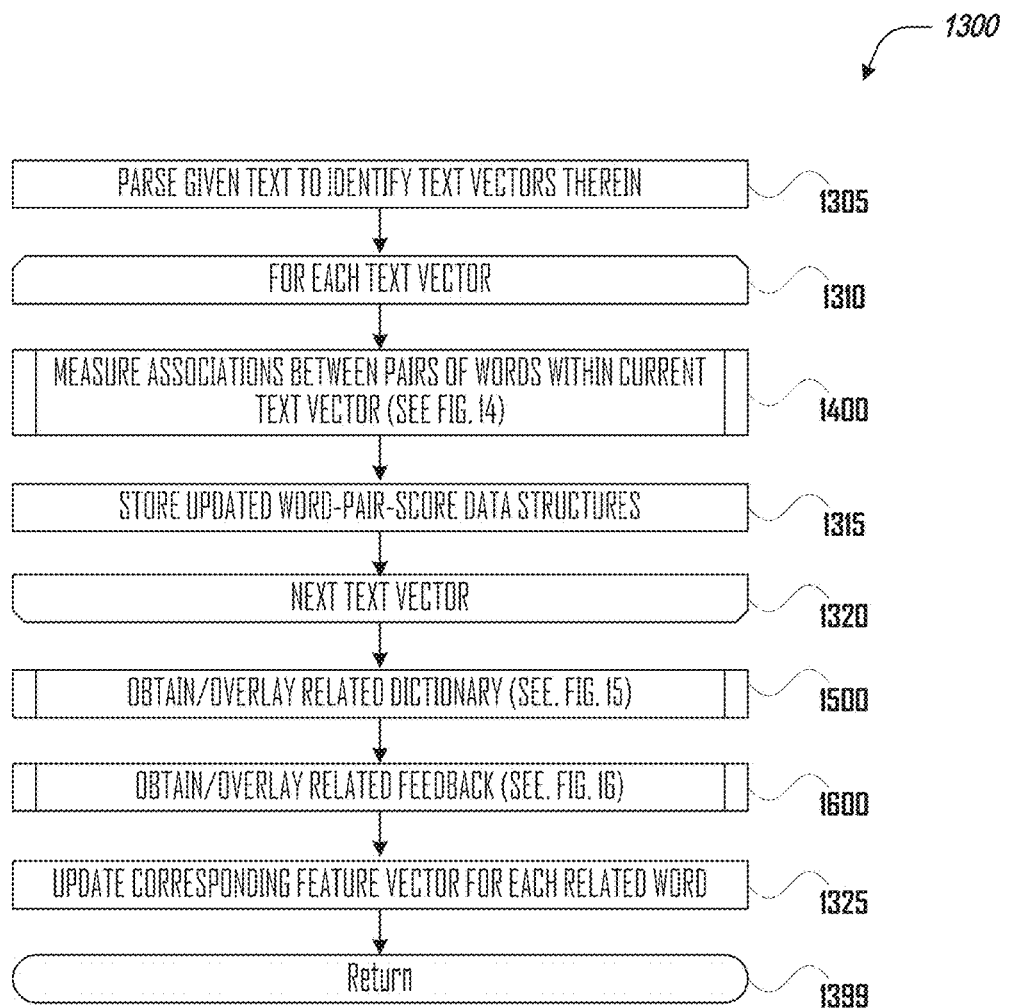
FIG. 13 illustrates a proximity-score subroutine for measuring associations between words that appear in a given text.

FIG. 13 illustrates a proximity-score subroutine 1300 for measuring associations between words that appear in a given text, such as may be performed by a search-service server 1100 in accordance with one embodiment.

In block 1305, proximity-score subroutine 1300 parses the given text to identify text vectors making up the text. Each text vector represents an ordered set of words, as defined above.

In some embodiments, proximity-score subroutine 1300 tags individual words according to their possible parts of speech. In some embodiments, proximity-score subroutine 1300 may employ a special-purpose NLP package or component for tokenization, sentence splitting, part-of-speech tagging, statistical parsing, and the like.

Beginning in opening loop block 1310, proximity-score subroutine 1300 processes each text vector.

In subroutine block 1400, proximity-score subroutine 1300 calls subroutine 1400 (see FIG. 14, discussed below) to measure associations between pairs of related words within the current text vector.

In ending loop block 1320, proximity-score subroutine 1300 iterates back to opening loop block 1310 to process the next independent clause, if any.

In subroutine block 1500, proximity-score subroutine 1300 calls subroutine 1500 (see FIG. 15, discussed below) to obtain and overlay related dictionary and/or classification taxonomy attribute data.

In subroutine block 1600, proximity-score subroutine 1300 calls subroutine 1600 (see FIG. 16, discussed below) to obtain and overlay related user feedback attribute data.

In block 1325, proximity-score subroutine 1300 updates an entry in a word-pair feature data structure (e.g., an attribute data feature vector) for each related word to incorporate the overlaid elated dictionary and/or classification taxonomy attribute data and/or related user feedback attribute data, if any.

Proximity-score subroutine 1300 ends in ending block 1399, returning to the caller.

Figure 14:
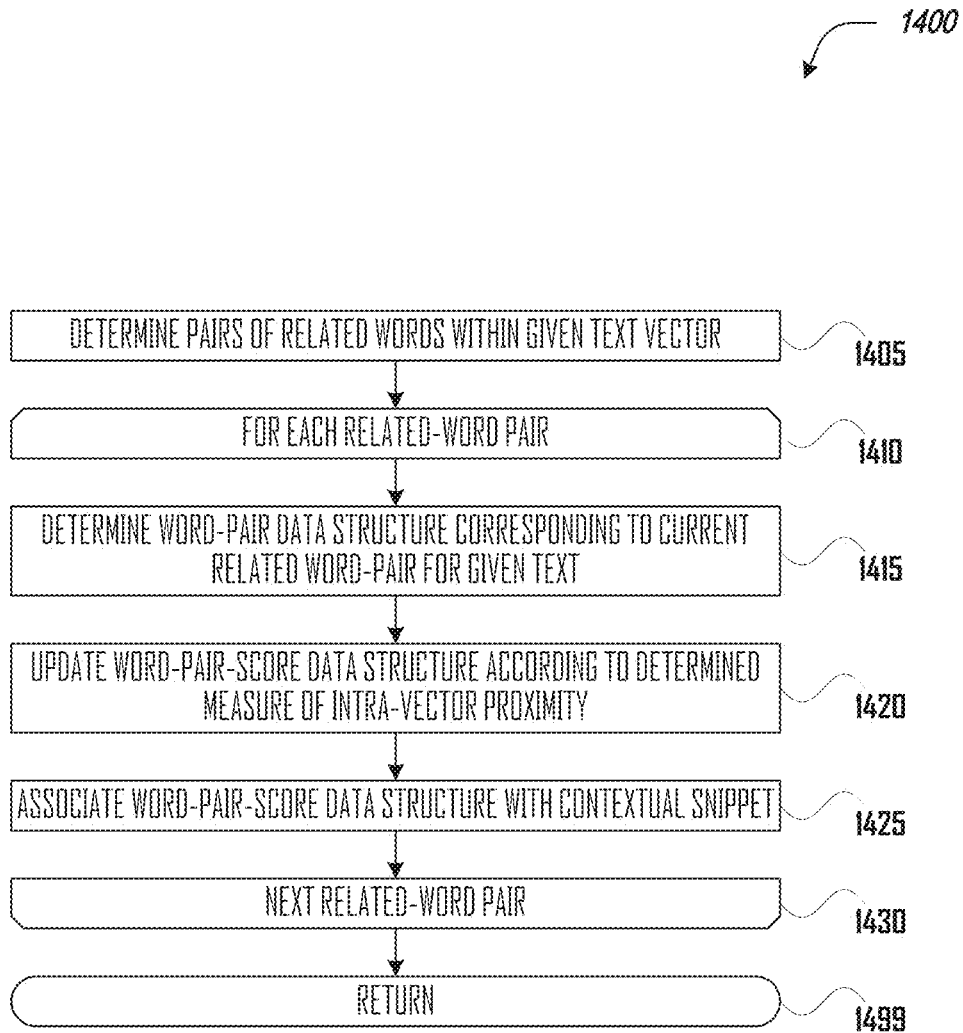
FIG. 14 illustrates a text-vector-processing subroutine for measuring associations between words that appear in a given text vector.

FIG. 14 illustrates a text-vector-processing subroutine 1400 for measuring associations between words that appear in a given text vector of a given text, such as may be performed by a search-service server 1100 in accordance with one embodiment.

In block 1405, text-vector-processing subroutine 1400 determines pairs of related words within the given text vector. For example, in one embodiment, each word within a text vector representing a clause or sentence may be determined to be related to each word that appears subsequently in the same clause or sentence. As mentioned above in connection with FIG. 12, word pairs can be cumulative and are not limited to two words.

Beginning in opening loop block 1410, text-vector-processing subroutine 1400 processes each related-word pair.

In block 1415, text-vector-processing subroutine 1400 determines a word-pair-score data structure corresponding to the current related-word pair for the given text. In many cases, the current related-word pair may also exist in other previously processed text vectors elsewhere in the given text. In such cases, a word-pair-score data structure corresponding to the current related-word pair may already exist; in which case, text-vector-processing subroutine 1400 identifies and obtains the existing word-pair-score (in this example, noun-pair-score) data structure. Otherwise, if text-vector-processing subroutine 1400 has not previously encountered the current related-word pair in the given text, text-vector-processing subroutine 1400 may initialize a new word-pair-score data structure for the current related-word pair in the given text.

In various embodiments, a word-pair-score data structure may include data slots or fields (including structured or unstructured records, pointers, or other means of associating data) for identifying the members of the current related-word pair, for indicating a measure of intra-vector proximity, and for providing context for places in which the current related-word pair appears in the given text.

In various embodiments, a word-pair-score data structure can include multiple measures of intra-vector proximity, such as an ordered or unordered set of measures of intra-vector proximity. For example, multiple measures of intra-vector proximity may relate to proximity measures within a given text, a portion of a text, or a set of texts.

In various embodiments, a word-pair-score data structure can be included in or form part of a word-pair feature data structure (e.g., a matrix or table) as described in further detail below. For example, some of the described data fields may be directly associated with an entry in the word-pair feature data structure, and some fields may be characterized as attributes of the word pair (e.g., part of a word-pair feature vector).

In block 1420, text-vector-processing subroutine 1400 updates the word-pair-score data structure determined in block 1425 according to a determined measure of intra-vector proximity.

In block 1425, text-vector-processing subroutine 1400 associates the word-pair-score data structure with a contextual snippet providing context from the text vector in the given text in which the words of the current related-word pair appear together. In some embodiments, a contextual snippet may include the sentence in which the words appear, as well as zero or more surrounding sentences.

In block 1430, text-vector-processing subroutine 1400 is performed for the next related-word pair, if any.

Text-vector-processing subroutine 1400 ends in ending block 1499, returning to the caller.

Figure 15:
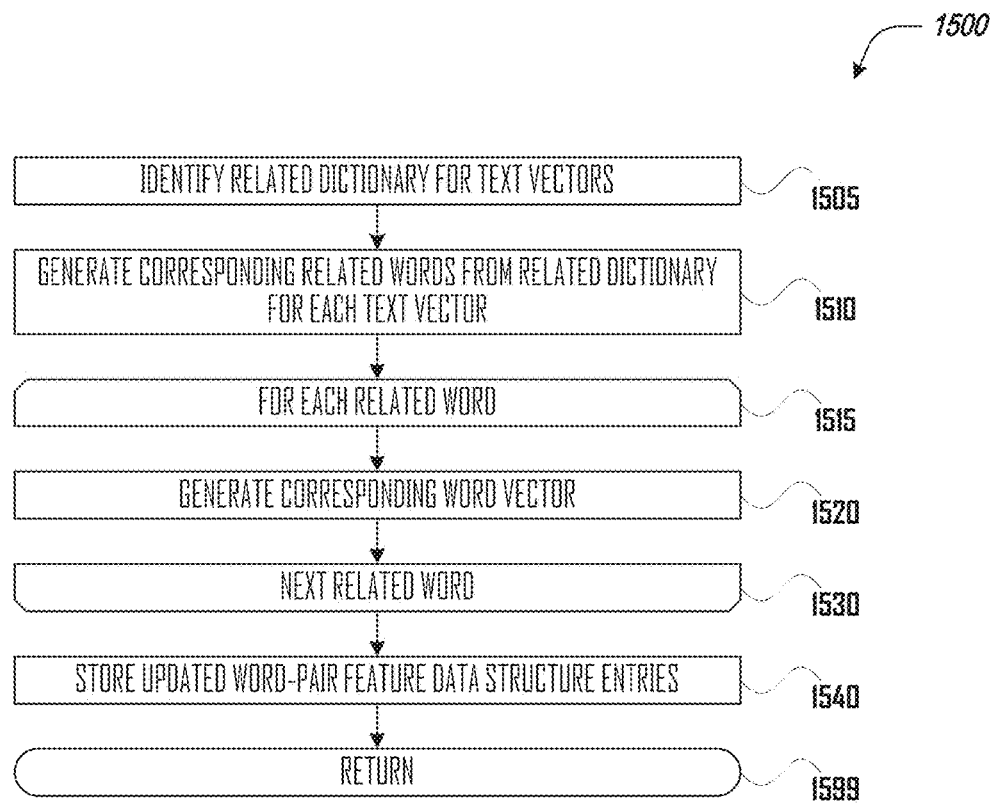
FIG. 15 illustrates a dictionary overlay subroutine for obtaining and overlaying related dictionary and/or classification taxonomy attribute data.

FIG. 15 illustrates a dictionary overlay subroutine 1500 for obtaining and overlaying related dictionary and/or classification taxonomy attribute data, such as may be performed by a search-service server 1100 in accordance with one embodiment.

In block 1505, dictionary overlay subroutine 1500 identifies a related dictionary for improving matches in text vectors. In one embodiment, a dictionary consists of any metadata attributes that can be associated to an individual word or a specific word-pair. Examples include any ontologies, folksonomies, wiki data collections (e.g., online encyclopedia data such as Wikipedia), product catalogs (public or private), etc.

A dictionary can be integrated into an implementation of dictionary overlay subroutine 1500 either statically from a known source (e.g., a fixed list of names with their attributes) or by, e.g., letting a web crawler crawl specific locations on the web and create a dynamic list to be matched against words from the document currently being processed or indexed by the computational engine. Thus the dictionary overlay subroutine 1500 can extract information from a select domain within the web, which it can in turn use as a dictionary.

In block 1510, dictionary overlay subroutine 1500 generates corresponding related words from a related dictionary or taxonomy for each text vector in a document text (or, e.g., in a text selection or a corpus of texts). Within a domain of knowledge, a domain-specific dictionary can define a ground truth of terms and relations. For example, a dictionary can provide information establishing an "is-a" relation (e.g., a finch is a bird). The dictionary overlay subroutine 1500 can incorporate taxonomy classifiers, dictionaries, and databases. For example, in the sentence "Seattle is named after Chief Seattle," dictionary overlay subroutine 1500 can determine that "city" is a related word to "Seattle" (because Seattle is a city). In some embodiments, dictionary overlay subroutine 1500 can use several dictionaries and classifiers (e.g., iteratively) on top of system-generated classes and types to improve search results.

Beginning in opening loop block 1515, dictionary overlay subroutine 1500 processes each related word.

In block 1520, dictionary overlay subroutine 1500 generates a corresponding word vector. For example, in one embodiment, the dictionary overlay subroutine 1500 generates a word embedding using a word-embedding generating tool such as SVD decomposition. The dictionary overlay subroutine 1500 is capable of incorporating domain specific dictionaries or databases to improve the results and a machine learning process. These dictionaries can be used to describe a particular entity or the relationship between two entities.

In one embodiment, the dictionary overlay subroutine 1500 puts any dictionary term match into a hash table and assigns an integer value. For example, if there are five terms in the hash table and dictionary overlay subroutine 1500 encounters a new name, it may assign the new name a value of six. By keeping similar terms in a similar range, dictionary overlay subroutine 1500 helps a neural network processing a training set to associate link and cluster based on the source, providing improved quality matches on a test, validation, and/or production data set.

In block 1530, dictionary overlay subroutine 1500 is performed for the next related word, if any.

In block 1540, dictionary overlay subroutine 1500 stores the updated word-pair feature data structure entries to include the dictionary overlay data (e.g., the generated word vectors for each related word).

Dictionary overlay subroutine 1500 ends in ending block 1599, returning to the caller.

Figure 16:
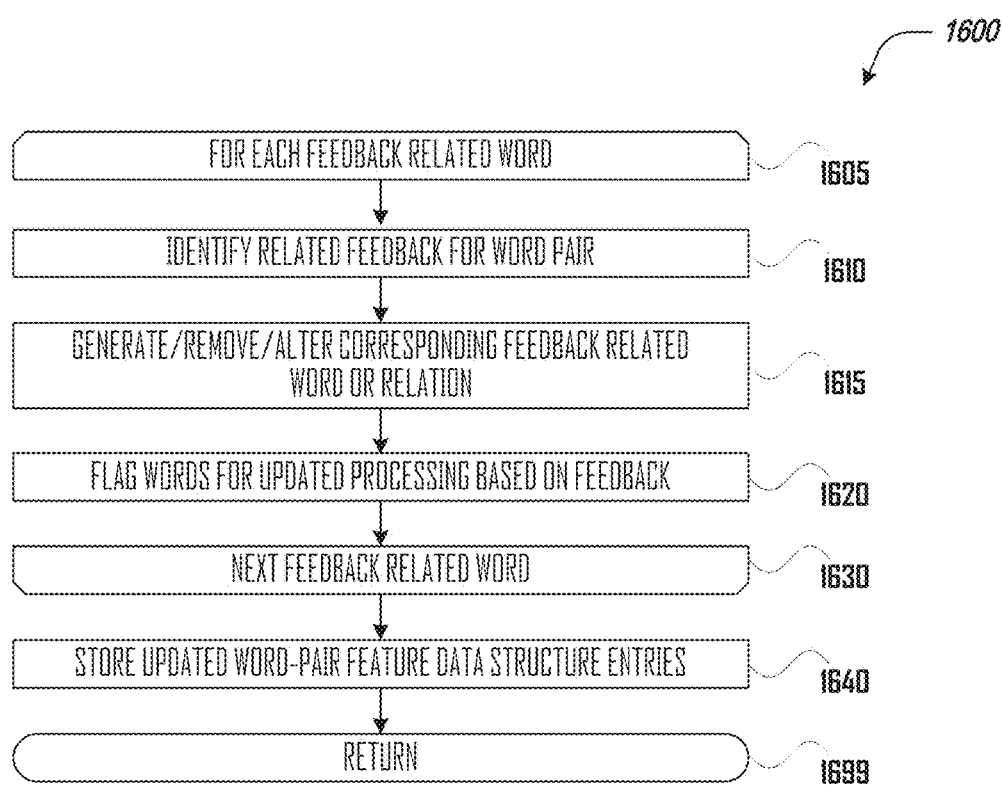
FIG. 16 illustrates a feedback overlay subroutine for obtaining and overlaying related user feedback attribute data.

FIG. 16 illustrates a feedback overlay subroutine 1600 for obtaining and overlaying related user feedback attribute data, such as may be performed by a search-service server 1100 in accordance with one embodiment.

Beginning in opening loop block 1605, feedback overlay subroutine 1600 processes each feedback related word.

In block 1610, feedback overlay subroutine 1600 identifies related feedback for a word pair, such as feedback received via a graphical user interface. FIGS. 19-22, described below, illustrate example interfaces for obtaining user feedback.

In various embodiments, the computational engine populating a word-pair feature data structure incorporates user feedback to improve match results. For example, user feedback can comprise a rating of the relevance of a related word presented as a search result. Such a relevancy rating can include a binary relevancy flag or switch that indicates feedback as to whether a specific word or word-pair is relevant in its current search context. As another example, user feedback can include a topic selection (e.g., selected from a list or proposed by the user) indicating how a word or word pair should be categorized, such as a topic name. The computational engine can add the user feedback topic selection to the word-pair feature data structure as an additional statistic for future computations or for re-computation of the search results.

In various embodiments, the search system (e.g., search-service server 1100) can process user feedback provided in terms of a new search result node or a new relationship between search result nodes, such as illustrated below in FIG. 21. To attribute such feedback to a word pair that has not already been recorded by the search system (e.g., not already present in a word-pair feature vector data structure), the search system can create a new word pair and add it to the word-pair feature vector data structure (or place it in a queue for later addition) in the context of the current search, including, e.g., noting that its source was user feedback.

In some embodiments, the search system may record an added node and/or relation between nodes (e.g., saving it in a word-pair feature data structure) with respect only to the user who added it. The search system can initialize a counter or conduct further automated analysis to determine often the added word pair is used (or, e.g., require supervisory approval) before propagating the change and presenting it as a result in searches conducted by other users.

In block 1615, feedback overlay subroutine 1600 generates, removes, or alters a corresponding feedback-related word or relation in response to the identified related feedback. In one embodiment, a feedback loop captures statistical parameters around corpus text where user feedback is generated in order to generalize the same user feedback across the text to quickly decide if an assigned class is relevant or irrelevant for the user.

For example, in a search results graph or document snippet, a user can select a word pair or a piece of text identifying a word-pair, and assign a potential class-type for the relation, which will be replicated through the corpus such that similar instances will be assigned the same class. Similarly, for text highlighted by the user and feedback changing a class-type, feedback overlay subroutine 1600 can capture the feedback and reassign the class-type. Similarly, extraneous unrelated terms may be identified and removed from search results.

In some embodiments, a user's feedback is moderated or enhanced by a weighting or scoring based upon one or more factors such as the individual user profile containing an indication of subject matter expertise, a community rating of the user or the user's contributions, data regarding the frequency and quality of the user's feedback (e.g., the frequency of quality feedback from the user, as rated by other users or administrators), and/or the number of users giving similar feedback. To ensure that feedback is qualified, feedback overlay subroutine 1600 can count the number of people who have marked the same feedback for highlighted text or a relationship type, and/or designate known researchers based on their credentials (which may be determined from specialized online communities, e.g., a professional social network or a scientific research website). For example, a user who is an acknowledged expert in a field may be assigned a high score, and a user whose feedback varies from a general consensus of other users, experts, or administrators may be assigned a low or negative score.

In one embodiment, for example, a user's feedback regarding a link between two words can be assigned a value of 1 by default. The user's feedback value may depend on the user's credentials; for example, an indication that the user is a domain expert or close collaborator can result in the feedback overlay subroutine 1600 assigning the user a maximum value, e.g., 5. Feedback ranging from 1 to 5 may be averaged over a period of time. Other registered users may be assigned a value of 3 initially. The value assigned to a user's feedback may be multiplied by −1 by the feedback overlay subroutine 1600 if the feedback is irrelevant or harmful to the system or quality of search results.

In block 1620, feedback overlay subroutine 1600 flags words for updated processing based upon the received feedback and changes made in response thereto. In some embodiments, feedback overlay subroutine 1600 processes feedback when received from a user. In some embodiments, feedback overlay subroutine 1600 stores feedback for processing after receiving a set of feedback information from one user or a threshold number of users, for processing at a predetermined time or after a period of time has elapsed, or when a command for processing feedback data is received.

In block 1630, In block 1615, feedback overlay subroutine 1600 is performed for the next feedback-related word, if any.

In block 1640, feedback overlay subroutine 1600 stores the updated word-pair feature data structure entries to include the feedback overlay data.

Feedback overlay subroutine 1600 ends in ending block 1699, returning to the caller.

FIG. 17 illustrates a word-pair feature data structure 1700 comprising a matrix or table of word-pair entries, containing skip-gram co-occurrence distances for a pair of words.

A skip-gram is an extension of an n-gram sequence of n words, in which the n words need not be adjacent but can skip over intermediate words. In some embodiments, a skip-gram parameter specifies the maximum number of words that can be skipped between any two words of a skip-gram. For example, in the text vector "Carolina Panthers are a professional American football team", valid skip-gram word pairs may include "football team" and "professional team" as well as "Carolina American".

In one embodiment, the system (e.g., search-service server 1100) prepares a skip gram model for a text vector or a text of a corpus of texts (e.g., a document) at the indexing stage. The indexer builds skip-gram models for all the sentences in a document. Skip-gram data for word pairs may be stored in a word-pair feature data structure. Then at a query stage, those skip-gram models containing words from a user query are aggregated.

In some embodiments, the system performs skip-gram computations using a moving window having a fixed size to identify word-pair co-occurrence distances. For example, starting at the beginning of a text vector, the system can iterate along the text and identify skip-gram pairs within the moving window. Using the text vector "Carolina Panthers are a professional American football team", a context window size of 3, and boldface on the current word to illustrate:

Carolina Panthers are a
(Carolina, Panthers), distance 1
(Carolina, are), distance 2
(Carolina, a), distance 3
Carolina Panthers are a professional
(Panthers, Carolina), distance 1
(Panthers, are), distance 1
(Panthers, a), distance 2
(Panthers, professional), distance 3
Carolina Panthers are a professional American
(are, Carolina), distance 2
(are, Panthers), distance 1
(are, a), distance 1
(are, professional), distance 2
(are, American), distance 3
Carolina Panthers are a professional American football
(a, are), distance 1
(a, Panthers), distance 2
(a, Carolina), distance 3
(a, professional), distance 1
(a, American), distance 2
(a, football), distance 3
Panthers are a professional American football team
(professional, a), distance 1
(professional, are), distance 2
(professional, Panthers), distance 3
(professional, American), distance 1
(professional, football), distance 2
(professional, team), distance 3
are a professional American football team
(American, professional), distance 1
(American, a), distance 2
(American, are), distance 3
(American, football), distance 1
(American, team), distance 2
a professional American football team
(football, American), distance 1
(football, professional), distance 2
(football, a), distance 3
(football, team), distance 1
professional American football team
(team, football), distance 1
(team, American), distance 2
(team, professional), distance 3

Using the above approach or a similar method, the system (e.g., search-service server 1100) can build skip-gram models for all the sentences in a document. In various embodiments, the system can iterate over forward vectors (as shown) or over backward vectors. In some embodiments, the system stores both direction and distance (e.g., using negative numbers to indicate backward distances) when generating skip-gram data.

In one embodiment, a search-service server 1100 aggregates skip-grams that contain words from a query. Then, once aggregated, the search-service server 1100 may collect the top k words as potential contenders, where k represents some number of significant words (e.g., 5 as a default) evaluated when creating focused contextually significant search results. Once the extra words representing potential topics or related words are identified, the search-service server 1100 may proceed with the graph extraction stage, in which the search-service server 1100 finds all potential paths between all the combination of words.

In one embodiment, based on the aggregate, a search-service server 1100 generates a vector of all the skip-gram models discovered throughout text. For example, if (football, American) occurred in 8 different sentences within a document, then a vector may be generated based in part on the exhibited sample distances for each occurrence of [1, 1, 1, 1, 2, 4, 3, 5].

In the search-service server 1100, the search engine may categorize the significant words into one of several classes, e.g., three classes. For example, they can be either a quality of the entity of interest (e.g., "football, American"), or a potential class-type (e.g., "company, Apple") or else an important marker but not descriptive enough to classify (e.g., non-deterministic).

In one embodiment, categorization is based on a variance score generated based on how far the term occurs from the entity of interest. For example, if the variance is less than 2, the search-service server 1100 considers the significant words to be descriptive enough to place into either and/or both of the two deterministic categories.

Subsequently, the average variance is generated to determine how far words have been from the term of interest. For example, if the average distance has been more than 3 then according to one embodiment there is a good chance that the word-term pair might represent a class-type (e.g., company-Apple). If the average distance is less than 3, then according to one embodiment the search-service server 1100 should classify the word-term pair as a quality to the entity of interest (e.g., American-football).

Thus, during query stage, a variety of dynamic filters may be created. For example, the query "lung, cancer" may produce the following dynamic filters:
a. Risk (class-type)
b. Cell (class-type)
c. Patients (quality)
d. Cases (quality)
e. Disease (class-type)
f. Smoking (non-deterministic)

Likewise, the query "self, driving, cars" may produce the following dynamic filters:
a. Cars (class-type)
b. Electric (quality)
c. Autonomous (quality)
d. Tesla (class-type)
e. Systems (class-type)

Thus, the word-pair feature data structure 1700 illustrated in FIG. 17 depicts an aggregated skip-gram data entry 1715 for the word-pair ("American", "football") as described above. The index word "American" 1705 appears on the vertical axis on the left edge of the matrix or table, among other words relating to Seattle, an American port city. The context word "football" 1710 appears on the horizontal axis on the top edge of the matrix or table.

The entry 1715 in the word-pair feature data structure for the word-pair ("American", "football") includes the aggregated skip-gram occurrence values of [1, 1, 1, 1, 2, 4, 3, 5], and the deterministic category assignment of "quality", indicating the type of relationship between the word pair as determined by the search-service server 1100.

Figure 18:
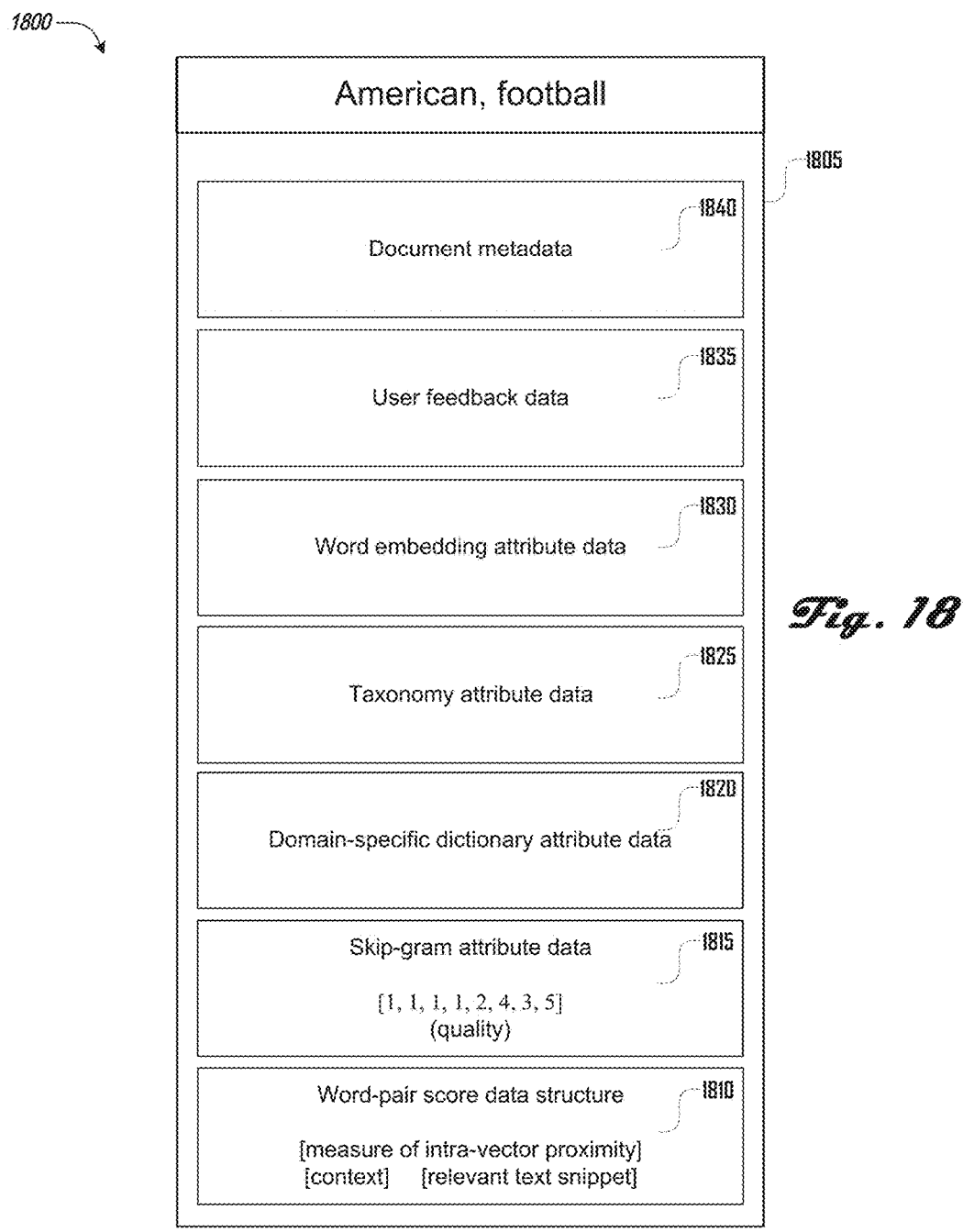
FIG. 18 illustrates a feature vector entry of attribute data for a word pair in a word-pair feature data structure.

FIG. 18 illustrates a feature vector entry 1800 of attribute data for a word pair in a word-pair feature data structure.

The illustrated word-pair entry 1800 in the word-pair feature data structure is for the word-pair ("American", "football") as discussed above in connection with FIG. 17 1715. The feature vector 1805 includes various types of data that a search-service server 1100 can use to generate more accurate search results with respect to the word-pair ("American", "football").

A word-pair-score data structure 1810 contains a measure of intra-text-vector (e.g., intra-independent-clause) proximity of the word pair. In addition, the word-pair-score data structure 1810 may contain context information and a relevant text snippet as discussed above in connection with FIG. 14.

The feature vector 1805 further includes skip-gram attribute data 1815. In the illustrated example, the skip-gram data for the word pair includes the aggregated skip-gram occurrence values of [1, 1, 1, 1, 2, 4, 3, 5] and the "quality" relationship category assignment.

Domain-specific dictionary attribute data 1820 in the feature vector 1805 may include, e.g., data that the proper nouns "NFL" and "NCAA" are potentially related organizational entities, as discussed above in connection with FIG. 15.

Taxonomy attribute data 1825 may include, e.g., a classification of American football as a sport or as a team sport, as discussed above in connection with FIG. 15. The feature vector 1805 may include, instead of or in addition to taxonomy attributes, classification or classifier data such as decision tree or classifier tree output, or name, date, or place classifier tags.

Word embedding attribute data 1830 may include a word embedding vector of numerical values (e.g., {0.272, −0.212, 0.403, 0.475. −0.089}) generated by a text-to-vector algorithm. Such a word embedding represents parameters of a vector representation for a word, expressing a likelihood of finding that word in the context of its surrounding words. For normalized (unit) vectors, the dot product (inner product) between them measures similarity: the dot product between two word vectors is larger when the vectors are more similar (highest for parallel vectors, and lowest for orthogonal vectors), so words used the same way in similar contexts will have larger dot products. Accordingly, the search-service server 1100 can use word embedding vector multiplication as an additional attribute for determining related word matches when generating search results.

The search-service server 1100 can combine different types of feature vector 1805 data to provide improved results. For example, the query "self, driving, car" may often find references to Yahoo-finance-Tesla or Bloomberg-Tesla co-occurring due to the nature of the text. The search-service server 1100 can feed into a deep learning system, as two channel input, a first channel representing all the skip-gram vectors for the text sample (e.g., where the user is marking feedback) and a second channel of a word embedding vector.

Most of the patterns outlined in the example can be generalized due to their common characteristic and the way text is structured. For example if an article is extracted from Yahoo news or Bloomberg news, the deep learning system or text parser will pick up query terms in the vicinity of headline tags which often read the proprietary disclaimer or the trademark of the source and are mostly equally distant from the entity of interest. The search-service server 1100 can therefore exclude them from search results.

Similarly for research articles, it is a common practice to write numbered examples in paragraphs that are picked up by the system as entities but can be eliminated from the results with the help of user-feedback.

User feedback data 1835 may include changes to previously suggested search results from the user, and/or revisions provided by a weighted consensus of users, as discussed above in connection with FIG. 16. User feedback attribute data for the word pair feature vector 1805 may include, for example, explicit feedback from indications of relevance, link type information, etc.; and/or implicit feedback from selection of terms for filtering, etc.

Document metadata 1840 may include attributes of one or more texts within which the word pair appears. For example, document metadata 1840 can include a title, author names, a publication date, page numbers, section and/or chapter headings (division numbers and/or heading text), etc. Some document metadata attributes are available at extraction time (when the search system processes texts) or are added by text extraction or parsing components. For example, such metadata can allow a user to limit a search to text under a particular title or section heading.

In some embodiments, feature vector 1805 data such as that illustrated in FIG. 18 allows the search-service server 1100 to process searches in languages other than English. The computational engine is not English-specific, but treats part-of-speech attributes as a feature. This allows the system to extract such part-of-speech tags in any language using a language-specific part-of-speech NLP classifier or tagger.

FIG. 19 illustrates a screenshot 1900 of search results presented in a graph or interactive radial map interface for the query "pc3".

The illustrated interface 1905 is presented via a special-purpose application or, for example, through a web browser screen. The search-service server 1100 presents the depicted search results 1910 for the search term "pc3" by building a graph of interconnected nodes with the node representing the search term "pc3" near the center of the graph.

The interface 1905 includes a search box 1915 that shows the search term "pc3". A control 1920 titled "Add Query for Comparison" allows a user to enter a second search term to identify an intersection between search result sets or a union of search result sets. A filter term box 1925 shows terms used to filter the initial search result set (none are shown). A list of link types 1930 shows various types of links between nodes in the graph 1910.

In the illustrated embodiment, the list of link types 1930 includes selection boxes for toggling display of various link types, so that the user can select particular link types for investigation.

In some embodiments, the search-service server 1100 tracks references-in and references-out for each search result entity to determine class-type relationships for the graph. For example, if there are more connections going out than coming in to an entity (represented as a node) based on a predetermined ratio (e.g., 5) or a dynamic machine-learning-trained threshold or ratio, the search-service server 1100 designates the node as a class-type. Thus, such a node is treated as a class-type for all the nodes immediately connected with the particular node.

In one embodiment, the search engine may be optimized, at the query stage, through clustering and assigning labels to search terms by computing dynamic entity types per query. In one embodiment, skip-gram representations are used to find contextually relevant words and phrases to find the connected terms and use them as potential labels for the cluster. Each label may be used as a dynamic filter. These dynamic filters use these contextually relevant words, in conjunction with the query terms, to find/identify a set of connected terms that complete a potential path.

For example, upon receiving a query for "lung, cancer" the search-service server 1100 determines that for this query there is an edge "et-A1" classified as cell, which is a frequently occurring pattern in life-sciences text. Similarly, the search engine notes that "example-1" and "example-2" occur frequently together.

In some embodiments, the search-service server 1100 can identify a section of text to which a user has expressed interest (e.g., through a search result contextual snippet) and use statistical features (e.g., skip-grams in conjunction with a search result reference key) to locate one or more similar text patterns across the corpus. The system can annotate the identified text section (e.g., for automatic highlighting and labeling), and can further replicate the applied label to the one or more similar text patterns across the corpus. By creating a feedback loop assisted by the skip-gram patterns, the search-service server 1100 can improve assigned label and text highlighting. In some embodiments, the system assigns labels based on the data extracted from specialized websites to create a domain-specific dictionary. The system can be made domain agnostic by automatically deducing important keywords and entity-types for a domain.

User feedback interface 1935 includes controls for allowing a user to add one or more relations, clear nodes, add a new node, or add a new link between nodes.

FIGS. 20A-B illustrate screenshots of an example user interface to rate or classify a search result.

FIG. 20A illustrates a screenshot 2000 of an interactive menu option for setting feedback. In the illustrated screenshot 2000, the search-service server 1100 provides a user an interface 2005 to provide feedback on the search results 2010. For example, the depicted contextual menu interface 2005 enables a user to adjust properties of the search results 2010, filter the search results 2010, save the search results 2010, find nodes that are immediate neighbors of a selected node, remove a node from the search results 2010, or "Set As . . . " 2015 to rate and classify a relationship to a node in the search results 2010 as further depicted in FIG. 20B.

FIG. 20B illustrates a screenshot 2050 of a dialog box marked "Set As . . . " 2055, enabling a user to provide user feedback indicating whether a provided search result is relevant or irrelevant, and to set a type of relationship for the search result. As illustrated, the user has marked the search result word relevant 2060, and set the type of relationship 2065 as an expression.

FIGS. 21A-D illustrate screenshots of an example user interface to add feedback including a new node and a relation in a search result.

Figure 21A:
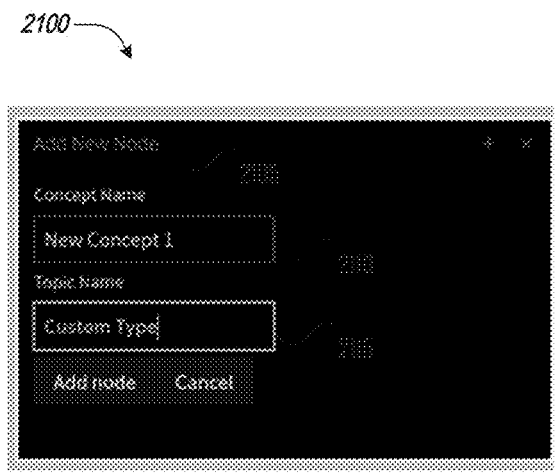
FIGS. 21A-D illustrate screenshots of an example user interface to add feedback including a new node and a relation in a search result.

FIG. 21A illustrates a screenshot 2100 of a user providing user feedback by adding a new search result word node to a set of search results (graph not shown). Using an "Add New Node" dialog 2105, the user can enter a concept or node name such as "New Concept 1" 2110 for the new node, and assign it a topic name such as "Custom Type" 2115.

In some embodiments, when a user adds a new node or link, the system (e.g., search-service server 1100) not only modifies the current search results, but also incorporates the addition as explicit user feedback data. For example, the system can record the feedback data as feature vector attribute data in a word-pair feature data structure for the relevant word pair. The system can also find similar relations in other searches. For example, when a user adds a new node for a particular search result or graph instance but does not explicitly link the new node to an existing node, the system can record the added node and provide it additional weight in the context of that search (e.g., in connection with all nodes in the search result graph) and use that to find similar patterns for future searches. If the user also explicitly links the new node to another node, the system can more precisely record and weight the node in the context of its connected nodes and its immediate neighbors as a basis to find similar patterns in other searches.

Figure 21B:
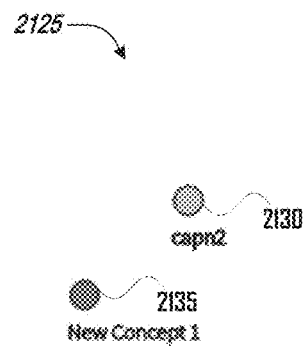

FIG. 21B illustrates a screenshot 2125 of a visual graph representation of the newly added "New Concept 1" node 2135 and an existing "capn2" node 2130.

Figure 21C:
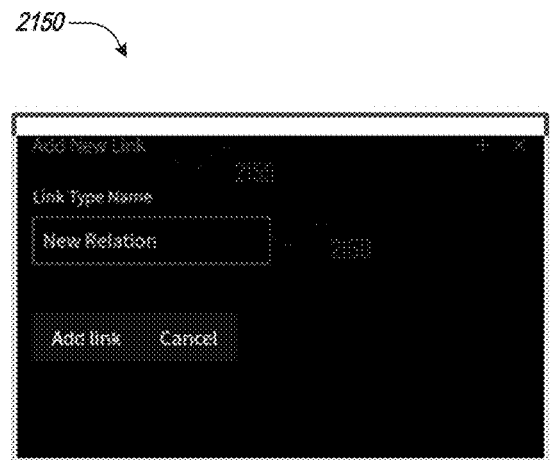
Figure 21D:
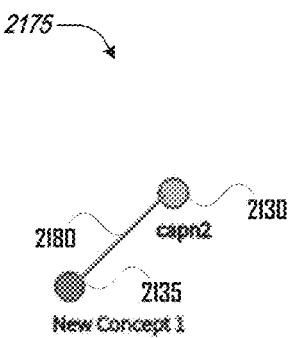

FIG. 21C illustrates a screenshot 2150 of an "Add New Link" dialog window 2155 enabling the user to connect the newly created "New Concept 1" node 2135 to the existing "capn2" node 2130 in the graph via a newly added link 2180 (illustrated in FIG. 21D). The system allows the user to specify a link type such as "New Relation" 2160 for the added link 2180. For example, the system allows a user to define a named relationship type between two entities, such as "Pathway", "Signaling", "Transformation", or "Transfection". The system is then capable of automatically finding similar relationships from the entire corpus by using the context and word vectors around that named relationship and identifying word pairs having similar characteristics.

FIG. 21D illustrates a screenshot 2175 of a visual graph representation of the newly added link 2180 connecting the "New Concept 1" node 2135 and the "capn2" node 2130.

Figure 22A:
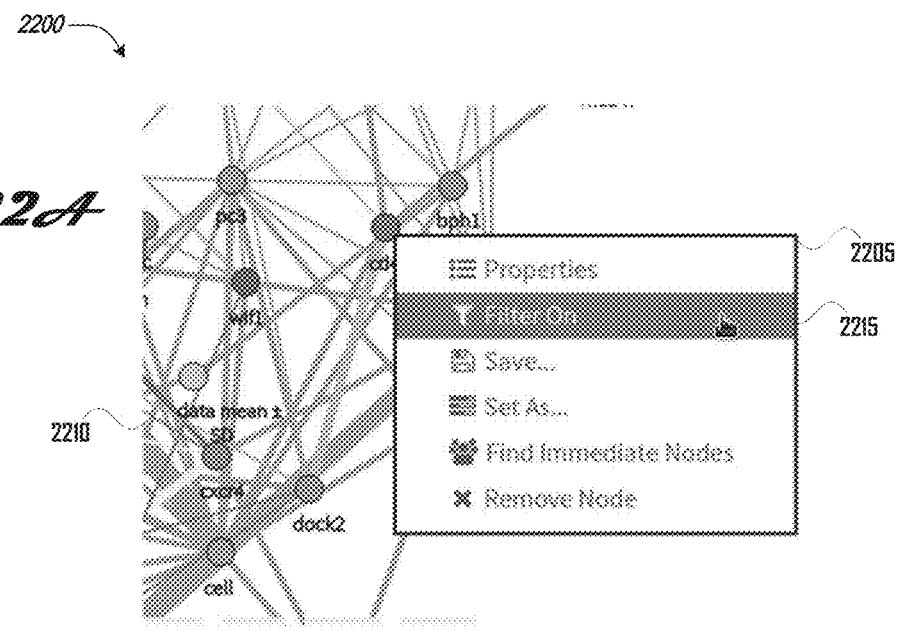
FIGS. 22A-B illustrate screenshots of an example user interface to filter a search result.
Figure 22B:
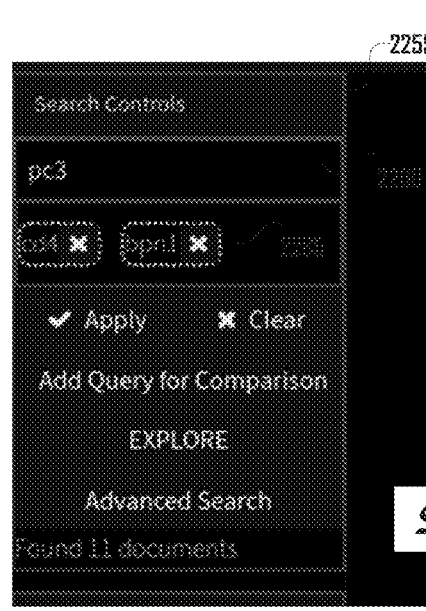

FIGS. 22A-B illustrate screenshots of an example user interface to filter a search result.

FIG. 22A illustrates a screenshot 2200 of an interactive menu option for applying filters to search results. In the illustrated screenshot 2200, the search-service server 1100 provides a user an interface 2205 to filter a set of search results 2210 (graph partially shown). For example, the depicted contextual menu interface 2205 (similar to contextual menu 2005 in FIG. 20A) enables a user to filter the search results 2210 by selecting a "Filter On" option 2215.

FIG. 22B illustrates a screenshot 2250 of example Search Controls 2255 that enable a user to filter a provided set of search results. For example, in a visual graph search result interface, once the graph is loaded, user has the option to select any number of nodes (e.g., one, a few, or many) and use that selection to narrow the query to look at more specific search results. Filtering limits the displayed search results to a selected subset. The system thus enables a user to focus on a portion of the search results of interest to the user and to exclude a portion of the search results not of interest to the user. For example, the user may have performed an initial search on the term "pc3" 2260. As illustrated, the user filters the search results using "cd4" and "bpn1" as filtering terms 2265. The system can apply filters as logical "AND" or logical "OR" operations.

In some embodiments, when a user applies a filter to search results, the system (e.g., search-service server 1100) not only updates the current search results, but also incorporates the filtering selection as implicit user feedback data. For example, the system can record the implicit feedback data as feature vector attribute data in a word-pair feature data structure for the relevant word pair. If, on the other hand, the user does not narrow the graph, the system can assign a negative feedback value to the results presented. In various embodiments, the magnitude of the negative feedback is very small but can accumulate over the time. If the user uses one or more filters to narrow the original query, the system can add a positive feedback value to the filtered results presented. The accumulation of negative unfiltered and positive filtered feedback allows the system to provide improved results over time for related searches by one user and/or for many users.

The search-service server 1100 then incorporates the feedback and the added node and link, which it adds to the skip-gram graph for the provided search results.

Although specific embodiments have been illustrated and described herein, it will be appreciated by those of ordinary skill in the art that alternate and/or equivalent implementations may be substituted for the specific embodiments shown and described without departing from the scope of the present disclosure. For example, although various embodiments are described above in terms of a search service provided by a server to a remote client, in other embodiments, search methods similar to those described herein may be employed locally on a client computer to find and display results within a local or remote corpus.

Similarly, although various embodiments are described above in terms of a search service that enables searching of a corpus of scientific and/or technical articles, other embodiments may use similar techniques to allow searching of a corpus of texts related to a non-technical, but specialized domain of knowledge such as movies, fashion, photography, or the like. This application is intended to cover any adaptations or variations of the embodiments discussed herein.

What is claimed is:

1. A computing apparatus for searching a corpus of texts relating to a domain of knowledge, the apparatus comprising a processor and a memory storing instructions that, when executed by the processor, configure the apparatus to:
   populate a word-pair feature data structure with word-pair proximity scores, wherein the populating comprises:
      determining a multiplicity of word-pair proximity scores measuring associations between pairs of words that appear in the corpus of texts, wherein the determining comprises, for each given text of the corpus of texts:
         parsing the given text to identify a text vector;
         selecting, within the text vector, a word pair including a first word and a second word;
         determining a measure of intra-clause proximity based at least in part on the first word's relationship to the second word within the text vector; and
         updating a word-pair-score data structure corresponding to the first word and the second word with the determined measure of intra-clause proximity; and
      for each word pair:
         populating an entry in the word-pair feature data structure with the corresponding word-pair-score data structure;
   obtain, for at least one word pair in the word-pair feature data structure, attribute data related to the word pair; and
   update the entry for the word pair in the word-pair feature data structure with the attribute data related to the word pair.

2. The computing apparatus of claim 1, further comprising instructions to:
   obtain a query including at least one search term related to the domain of knowledge;
   identify, by the computer, one or more related words in the word-pair feature data structure that are associated with the search term within the corpus of texts,
      wherein the identifying one or more related words is based at least in part on each of the word-pair-score data structure and the attribute data related to the word pair;
   select, by the computer, for a related word, a section of text from one of the plurality of texts from the corpus of texts, wherein, in each selected section of text, the search term and the related word appear within the same text vector; and
   provide, by the computer, the one or more related words and data associated with the plurality of texts for presentation as search results.

3. The computing apparatus of claim 2, wherein obtaining the attribute data related to the word pair comprises obtaining user feedback rating relevance of a related word presented as a search result.

4. The computing apparatus of claim 2, wherein obtaining the attribute data related to the word pair comprises obtaining user feedback setting a type of a related word presented as a search result.

5. The computing apparatus of claim 2, wherein obtaining the attribute data related to the word pair comprises obtaining user feedback identifying an additional word and a link or relation to the search term or to a related word.

6. The computing apparatus of claim 2, wherein obtaining the attribute data related to the word pair comprises weighting user feedback data based at least in part on the identity of a user.

7. The computing apparatus of claim 2, wherein obtaining the attribute data related to the word pair comprises obtaining implicit user feedback data based at least in part on the user having selected a related word presented as a search result to focus the search.

8. The computing apparatus of claim 7, further comprising instructions to determine a value adjustment to apply to the search result based at least in part on the implicit user feedback data.

9. The computing apparatus of claim 1, wherein the text vector comprises an independent clause in the text.

10. The computing apparatus of claim 1, wherein the word-pair feature data structure comprises a matrix of word-pair entries implemented as a hash table, a multidimensional array, a multidimensional list, or a key-value map data structure indexed by at least one word of each word pair, and wherein each entry comprises a container for or reference to a word-pair-score data structure and at least one attribute data record.

11. The computing apparatus of claim 1, wherein each entry in the word-pair feature data structure comprises a feature vector having a length, wherein the length of the vector corresponds to a number of attributes relating to the word-pair entry, such that populating or updating an entry for a word pair in the word-pair feature data structure comprises adding or updating vector data.

12. The computing apparatus of claim 1, wherein updating the entry for the word pair in the word-pair feature data structure comprises associating a plurality of attributes with the word pair.

13. The computing apparatus of claim 1, wherein obtaining the attribute data associated with the word pair includes obtaining at least one of: (a) weighted or unweighted implicit user feedback data based on user interaction with search results; or (b) explicit user-defined link data.

14. The computing apparatus of claim 1, wherein obtaining the attribute data associated with the word pair includes obtaining at least one of: (c) dictionary match data; (d) taxonomy data; or (e) classifier data.

15. The computing apparatus of claim 1, wherein obtaining the attribute data associated with the word pair includes obtaining at least one of: (f) text-to-vector word embedding data; or (g) skip-gram word relation data.

16. The computing apparatus of claim 1, wherein obtaining the attribute data associated with the word pair includes obtaining at least one of: (h) source document section heading metadata; (i) source document author metadata; or (j) source document publication date metadata.

17. The computing apparatus of claim 1, wherein a word-pair proximity score measuring associations between a first word and a second word of a word pair further measures cumulative associations between a third word and the word pair.

18. The computing apparatus of claim 1, further comprising instructions to:
presenting, by the computer, a visual representation of the search term and the one or more related words as search results; and
providing an interface means for a user to provide feedback on a related word or on a link to a related word, to edit a relation to a related word, or to add an additional word to the visual representation.

19. The computing apparatus of claim 18, wherein the visual representation comprises a tag-cloud interface.

20. The computing apparatus of claim 18, wherein the visual representation comprises a visual graph of the search term and the one or more related words as search results, such that:
the related words are presented as nodes, and at least one node is presented with a graph link to the search term or to another related word node; and
the interface means allows a user to provide feedback on a related word or on a link to a related word node in the visual graph, to edit a relation to a node in the visual graph, or to add a node to the visual graph.

21. The computing apparatus of claim 1, further comprising instructions to identify similar text patterns across the corpus based in part on the attribute data associated with the word pair.

22. The computing apparatus of claim 21, further comprising instructions to annotate the similar text patterns across the corpus, based in part on the search term and the related words, for automatic highlighting and labeling.

23. The computing apparatus of claim 21, further comprising instructions to replicate any labels applied in each of the selected plurality of texts to the similar text patterns across the corpus.

24. The computing apparatus of claim 1, wherein the corpus of texts includes web pages within a domain and the computing apparatus further comprises instructions to assign labels to similar text patterns across the corpus based in part on domain specific dictionaries extracted from one or more specialized websites associated with the domain.

25. The computing apparatus of claim 24, wherein the assigning labels to similar text patterns across the corpus includes assigning a topic type to an entity and adding words from a dictionary that are strongly associated with the search term.

26. The computing apparatus of claim 1, further comprising instructions to automatically deduce important keywords and entity-types for a domain based in part on identified statistical patterns identified within the selected plurality of texts.

27. A method, performed by a computing system, of searching a corpus of texts relating to a domain of knowledge, the method comprising:
populating a word-pair feature data structure with word-pair proximity scores, wherein the populating comprises, by the computer:
determining a multiplicity of word-pair proximity scores measuring associations between pairs of words that appear in the corpus of texts, wherein the determining comprises, for each given text of the corpus of texts:
parsing the given text to identify a text vector;
selecting, within the text vector, a word pair including a first word and a second word;
determining a measure of intra-clause proximity based at least in part on the first word's relationship to the second word within the text vector; and
updating a word-pair-score data structure corresponding to the first word and the second word with the determined measure of intra-clause proximity; and
for each word pair:
populating an entry in the word-pair feature data structure with the corresponding word-pair-score data structure;
obtaining, for at least one word pair in the word-pair feature data structure, attribute data related to the word pair; and
updating the entry for the word pair in the word-pair feature data structure with the attribute data related to the word pair.

28. A non-transitory computer-readable storage medium having stored thereon instructions that, when executed by a processor, configure the processor to:
populate a word-pair feature data structure with word-pair proximity scores, wherein the populating comprises:
determining a multiplicity of word-pair proximity scores measuring associations between pairs of words that appear in the corpus of texts, wherein the determining comprises, for each given text of the corpus of texts:

parsing the given text to identify a text vector;
selecting, within the text vector, a word pair including a first word and a second word;
determining a measure of intra-clause proximity based at least in part on the first word's relationship to the second word within the text vector; and
updating a word-pair-score data structure corresponding to the first word and the second word with the determined measure of intra-clause proximity; and for each word pair:
populating an entry in the word-pair feature data structure with the corresponding word-pair-score data structure;

obtain, for at least one word pair in the word-pair feature data structure, attribute data related to the word pair; and update the entry for the word pair in the word-pair feature data structure with the attribute data related to the word pair.

\* \* \* \* \*